US007721072B2

(12) United States Patent
Watanabe et al.

(10) Patent No.: US 7,721,072 B2
(45) Date of Patent: May 18, 2010

(54) INFORMATION PROCESSING METHOD AND APPARATUS, RECORDING MEDIUM, AND PROGRAM

(75) Inventors: Yasuhiro Watanabe, Kanagawa (JP); Shuichi Konami, Chiba (JP)

(73) Assignee: Sony Corproation (JP)

( * ) Notice: Subject to any disclaimer, the term of this patent is extended or adjusted under 35 U.S.C. 154(b) by 867 days.

(21) Appl. No.: 11/592,021

(22) Filed: Nov. 2, 2006

(65) Prior Publication Data

US 2007/0113156 A1 May 17, 2007

(30) Foreign Application Priority Data

Nov. 2, 2005 (JP) ............................ P2005-319723

(51) Int. Cl.
*G06F 7/38* (2006.01)
(52) U.S. Cl. ...................................... 712/223; 714/799
(58) Field of Classification Search .................. 712/223; 714/799
See application file for complete search history.

(56) References Cited

U.S. PATENT DOCUMENTS

| 5,408,597 | A | * | 4/1995 | Kita et al. .................... 345/440 |
| 5,469,553 | A | * | 11/1995 | Patrick ........................ 713/323 |
| 5,634,112 | A | * | 5/1997 | Thome et al. ................. 711/154 |
| 5,655,096 | A | * | 8/1997 | Branigin ...................... 712/200 |
| 5,697,788 | A | * | 12/1997 | Ohta ........................... 434/118 |
| 5,742,825 | A | * | 4/1998 | Mathur et al. ................ 719/329 |
| 6,157,864 | A | * | 12/2000 | Schwenke et al. .............. 700/79 |
| 6,268,853 | B1 | * | 7/2001 | Hoskins et al. ................ 700/83 |
| 7,051,069 | B2 | * | 5/2006 | Smithline et al. ........... 709/203 |
| 7,191,237 | B2 | * | 3/2007 | Jodra et al. .................. 709/228 |
| 7,197,502 | B2 | * | 3/2007 | Feinsmith .................... 707/100 |
| 7,302,698 | B1 | * | 11/2007 | Proudler et al. ................. 726/2 |
| 2003/0154080 | A1 | * | 8/2003 | Godsey et al. .............. 704/251 |

FOREIGN PATENT DOCUMENTS

JP          06-110767 A        4/1994

* cited by examiner

*Primary Examiner*—M. Mujtaba K Chaudry
(74) *Attorney, Agent, or Firm*—Lerner, David, Littenberg, Krumholz & Mentlik, LLP

(57) ABSTRACT

An information processing method includes generating a state transition diagram based on state transition information; displaying the state transition diagram; manipulating the displayed state transition diagram; updating the state transition information in accordance with how the state transition diagram has been manipulated; and storing a position of a state designated as a transition starting state by the manipulating step. When the position of the transition starting state has been specified by the manipulating step, the displaying step displays as a pointer an icon indicating that the position of the transition starting state has been specified. When a position of a transition destination state has been specified by the manipulating step, the displaying step displays a transition directed from the stored transition starting state toward the transition destination state, and the updating step updates the state transition information by adding information of the transition to the state transition information.

6 Claims, 22 Drawing Sheets

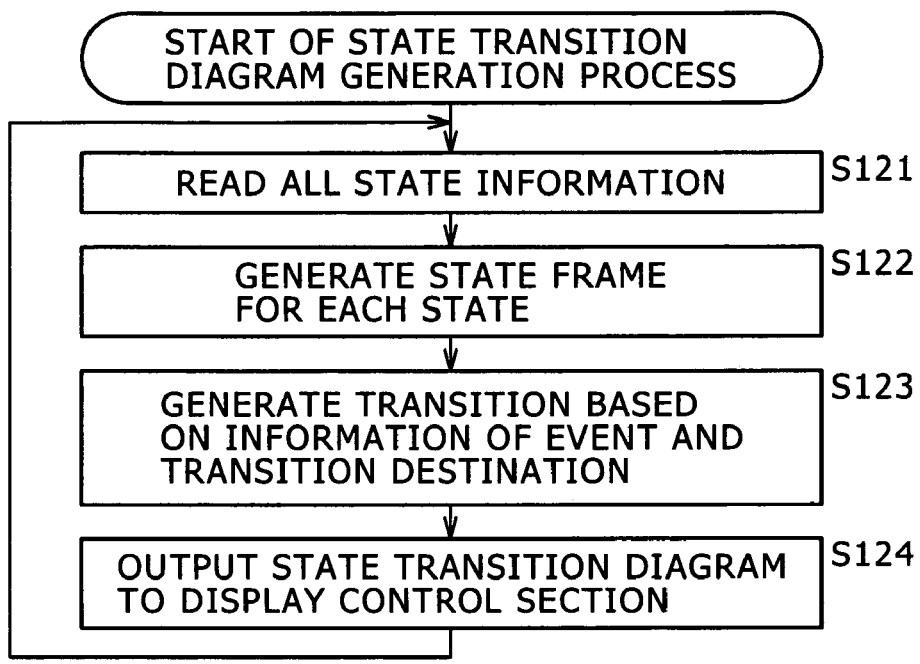
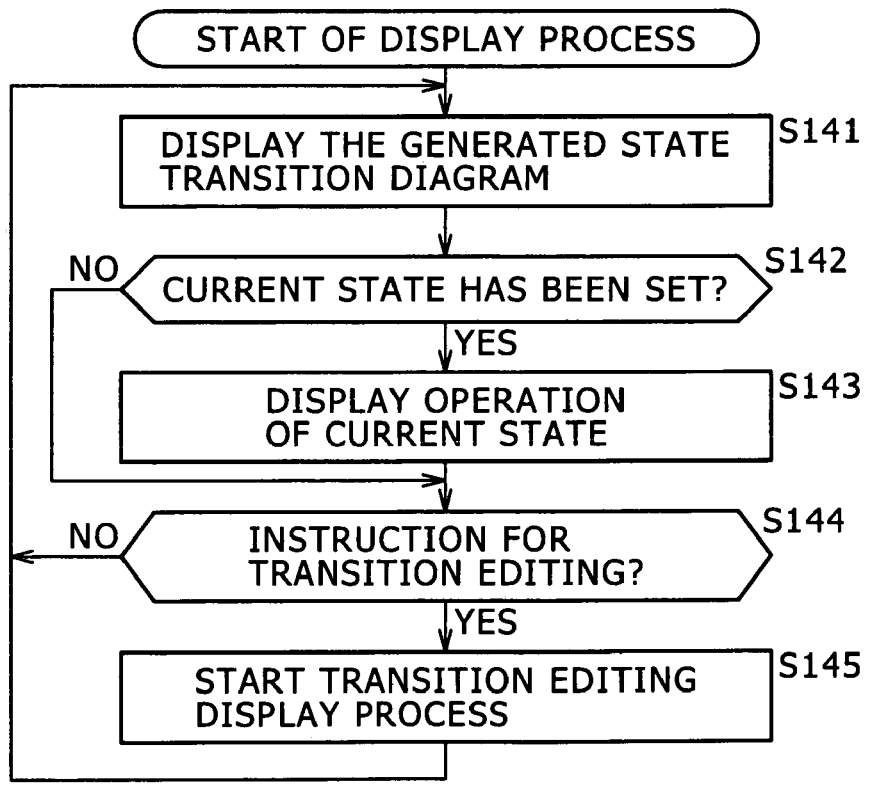

ns

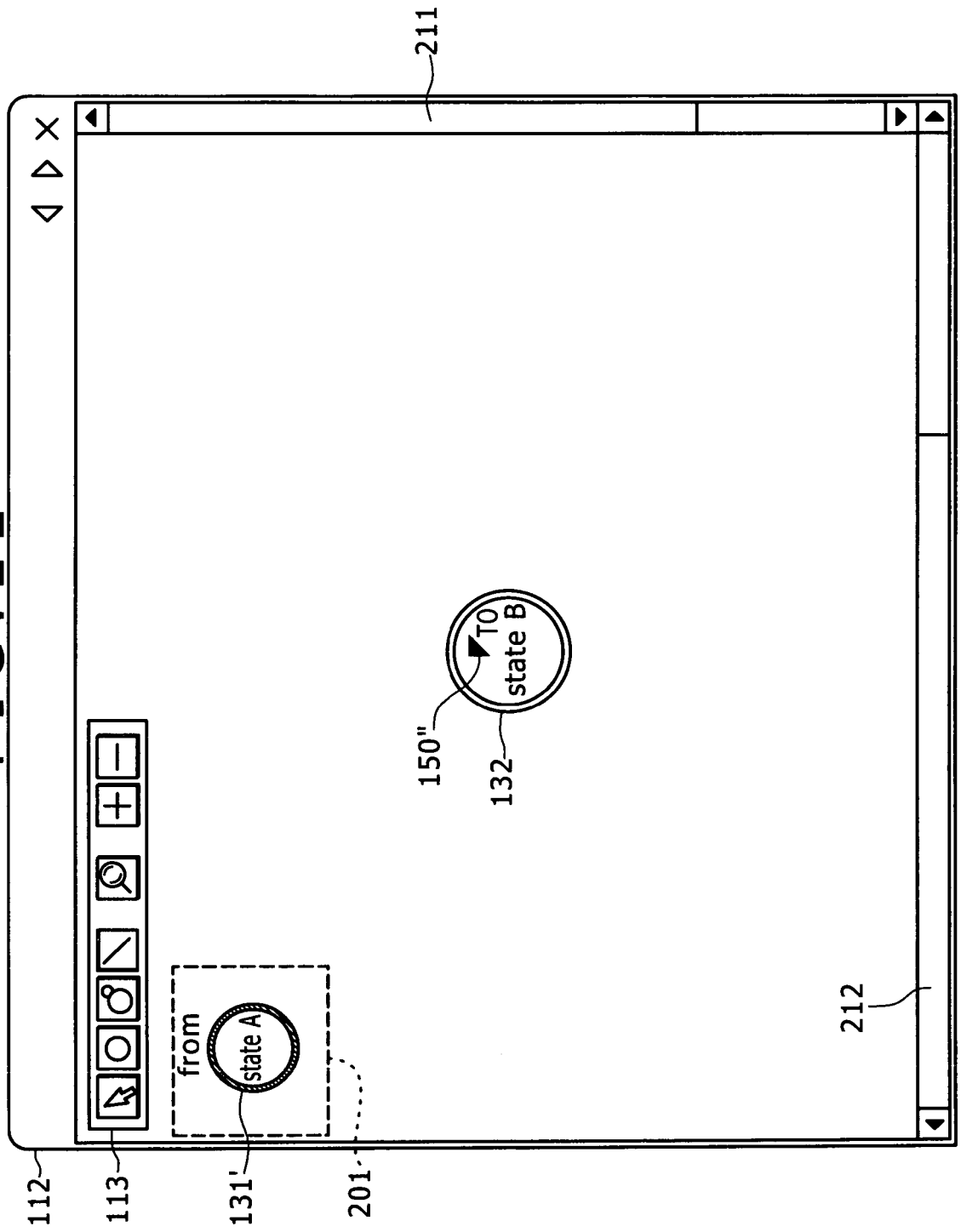

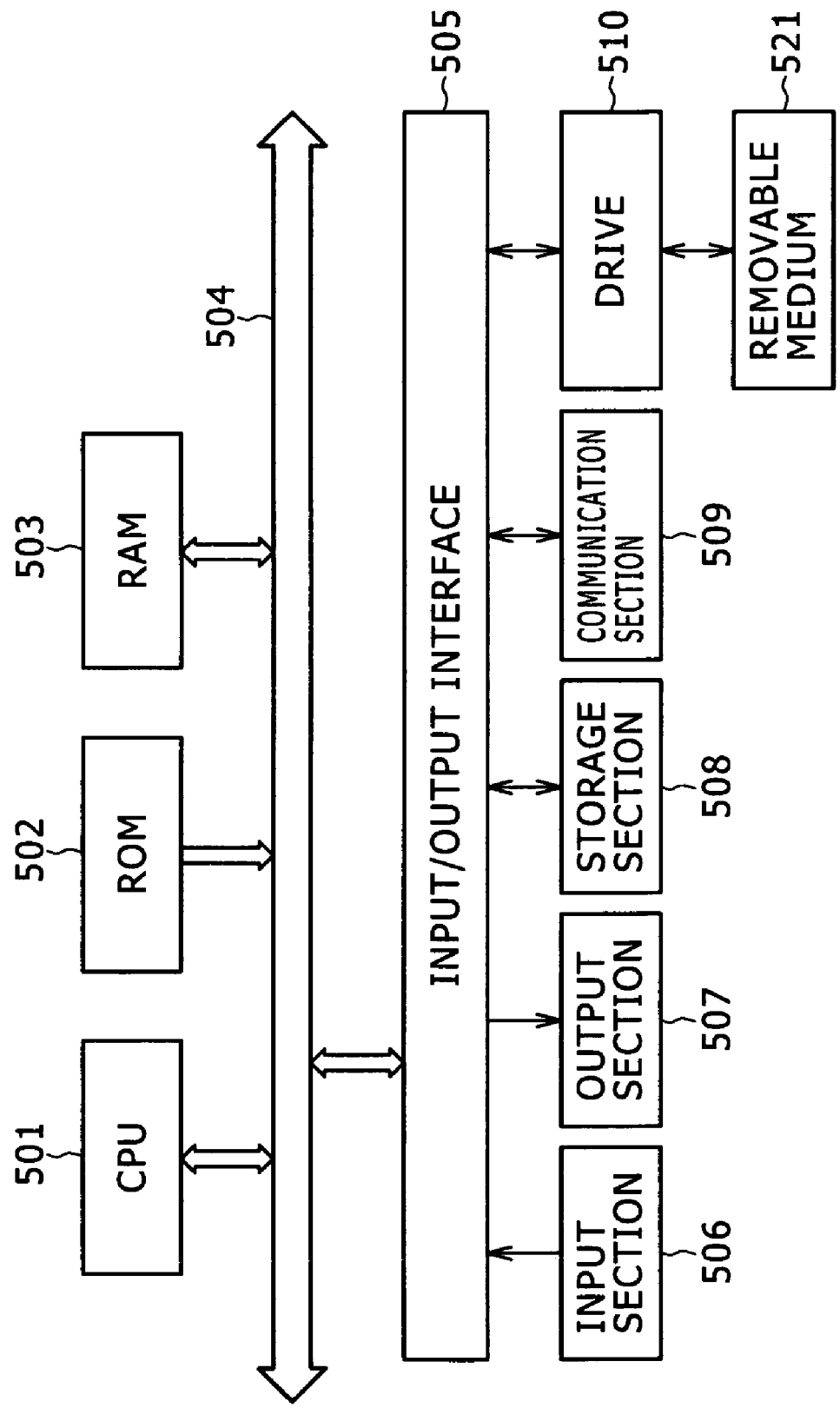

INFORMATION PROCESSING METHOD AND APPARATUS, RECORDING MEDIUM, AND PROGRAM

CROSS-REFERENCE TO RELATED APPLICATIONS

The present application claims priority from Japanese Patent Application No. JP 2005-319723 filed on Nov. 2, 2005, the disclosure of which is hereby incorporated by reference herein.

BACKGROUND OF THE INVENTION

1. Field of the Invention

The present invention relates to an information processing method and apparatus, a recording medium, and a program. In particular, the present invention relates to an information processing method and apparatus, a recording medium, and a program for improving efficiency in developing a user interface (UI) program using a state transition diagram.

2. Description of the Related Art

Software development tools that aid in development of application software programs are becoming increasingly widespread. For example, there is a software development tool that aids in object-oriented program development (see, for example, Japanese Patent Laid-open No. Hei 6-110767 (corresponding U.S. Pat. No. 5,761,493)).

In addition, there has been proposed a software development tool for a user interface (UI) of an application software program which uses a state transition diagram typified by a unified modeling language (UML).

The state transition diagram shows a set of states, and for each of the states, a logical description of an operation to be executed therein is provided. The state transition diagram also shows, regarding each of the states, a destination of a transition that will be triggered when a predetermined event occurs in that particular state. The aforementioned software development tool for a UI of an application software program displays a program in the form of a state transition diagram, and a user's manipulation of the displayed state transition diagram causes a change in the program so as to reflect the user's manipulation of the state transition diagram, whereby edition of the program is achieved.

During the above-described edition of the state transition diagram, the user may perform an operation of drawing a "transition" (i.e., a state transition line) from a state frame representing a first state toward a state frame representing a second state in order to indicate that occurrence of a predetermined event in the first state causes a transition to the second state.

In known software development tools, the transition is drawn in the following manner: first, a pointer is moved using a mouse or the like onto a state frame representing a state that is to be a transition starting point, and a right or left button, for example, is depressed to set the position of the state frame that is to be the transition starting point; and then, with the button kept held down, the pointer is moved by moving the mouse onto a state frame representing a state that is to be a transition end point, and the button is released with the pointer located within the state frame of the desired transition destination state. As a result, the state frame of the transition starting state and the state frame of the transition destination state are linked by the transition.

The above operation, however, may cause a problem in the case where a long transition need be drawn or where the drawing of a transition involves window scrolling. This is because, in such cases, an accidental release of the button is easy to occur while moving the mouse. This may result in an accidental release of the button before the pointer reaches a desired position, resulting in failure to draw a desired transition.

As another method for drawing a transition, there has been proposed a function of drawing a line segment between desired starting and end points, which are designated by clicking, for example, the right or left button of the mouse after moving the pointer to the respective points using the mouse. In this method, in which the starting and end points are simply designated, a user may sometimes be confused as to whether he or she is now supposed to be trying to designate the starting point or the end point by moving the pointer and clicking the mouse button. Moreover, in the case where the user attempts to draw a plurality of transitions at a time, the user may have to rely on his or her own memory to recognize the current situation, which may lead to failure to draw the right transitions.

An advantage of the present invention is to reduce the likelihood of such failure by, in particular, enabling accurate drawing of a line segment such as a transition on the state transition diagram, and thereby improve the efficiency in program development.

SUMMARY OF THE INVENTION

An information processing method according to one embodiment of the present invention includes generating a state transition diagram based on state transition information including information of operations to be performed in respective states, events that trigger transitions in the respective states, and transition destination states of the respective events. The method further includes displaying the state transition diagram; manipulating the displayed state transition diagram; updating the state transition information in accordance with how the state transition diagram has been manipulated; and storing a position of a state designated as a transition starting state by the manipulating step. When the position of the transition starting state has been specified by the manipulating step, the displaying step displays as a pointer an icon indicating that the position of the transition starting state has been specified. When a position of a transition destination state has been specified by the manipulating step, the displaying step displays a first transition directed from the stored transition starting state toward the transition destination state, and the updating step updates the state transition information by adding information of the first transition to the state transition information.

When the position of the transition starting state has been specified by the manipulating step, the displaying step may display a second transition joining the pointer with the position of the transition starting state.

An information processing apparatus according to another embodiment of the present invention includes generation means; display means; manipulation means; update means; and storage means. The generation means generates a state transition diagram based on state transition information including information of operations to be performed in respective states, events that trigger transitions in the respective states, and transition destination states of the respective events. The display means displays the state transition diagram. The manipulation means manipulates the displayed state transition diagram. The update means updates the state transition information in accordance with how the state transition diagram has been manipulated. The storage means stores a position of a state designated as a transition starting state by the manipulation means. When the position of the transition starting state has been specified by the manipulation means, the display means displays as a pointer an icon indicating that the position of the transition starting state has been specified. When a position of a transition destination state has been specified by the manipulation means, the display means displays a first transition directed from the stored transition starting state toward the transition destination state, and the update means updates the state transition information by adding information of the first transition to the state transition information.

According to yet another embodiment of the present invention, there is provided a computer-readable recording medium recorded with a program that causes a computer to execute an information processing method, the method including generating a state transition diagram based on state transition information including information of operations to be performed in respective states, events that trigger transitions in the respective states, and transition destination states of the respective events; and displaying the state transition diagram. The method further includes manipulating the displayed state transition diagram; updating the state transition information in accordance with how the state transition diagram has been manipulated; and storing a position of a state designated as a transition starting state by the manipulating step. When the position of the transition starting state has been specified by the manipulating step, the displaying step displays as a pointer an icon indicating that the position of the transition starting state has been specified. When a position of a transition destination state has been specified by the manipulating step, the displaying step displays a first transition directed from the stored transition starting state toward the transition destination state, and the updating step updates the state transition information by adding information of the first transition to the state transition information.

According to yet another embodiment of the present invention, there is provided a program that causes a computer to execute an information processing method, the method including generating a state transition diagram based on state transition information including information of operations to be performed in respective states, events that trigger transitions in the respective states, and transition destination states of the respective events; and displaying the state transition diagram. The method further includes manipulating the displayed state transition diagram; updating the state transition information in accordance with how the state transition diagram has been manipulated; and storing a position of a state designated as a transition starting state by the manipulating step. When the position of the transition starting state has been specified by the manipulating step, the displaying step displays as a pointer an icon indicating that the position of the transition starting state has been specified. When a position of a transition destination state has been specified by the manipulating step, the displaying step displays a first transition directed from the stored transition starting state toward the transition destination state, and the updating step updates the state transition information by adding information of the first transition to the state transition information.

According to yet another embodiment of the present invention, a state transition diagram is generated based on state transition information including information of operations to be performed in respective states, events that trigger transitions in the respective states, and transition destination states of the respective events; the generated state transition diagram is displayed; the displayed state transition diagram is manipulated; the state transition information is updated in accordance with how the state transition diagram has been manipulated; and a position of a state designated as a transition starting state is stored. When the position of the transition starting state has been specified, an icon indicating that the position of the transition starting state has been specified is displayed as a pointer. When a position of a transition destination state has been specified, a first transition directed from the stored transition starting state toward the transition destination state is displayed, and information of the first transition is added to the state transition information, whereby the state transition information is updated.

The information processing apparatus may be either an independent apparatus or a block of an information processing apparatus that performs information processing.

As described above, according to one embodiment of the present invention, accurate drawing of a line segment such as a transition on the state transition diagram becomes possible, and improvement of efficiency in development of a UI program is achieved.

BRIEF DESCRIPTION OF THE DRAWINGS

FIG. 9 is a flowchart for explaining a state transition diagram generation process performed by the state transition program editing apparatus of FIG. 1;

FIG. 10 is a flowchart for explaining a display process performed by the state transition program editing apparatus of FIG. 1;

FIGS. 14 to 22 are illustrations for explaining the transition editing display process performed by the state transition program editing apparatus of FIG. 1; and FIG. 23 illustrates the structure of an exemplary personal computer employed in the case where the internal electrical structure of the state transition program editing apparatus 1 of FIG. 1 is implemented by software.

DETAILED DESCRIPTION

Figure 1:
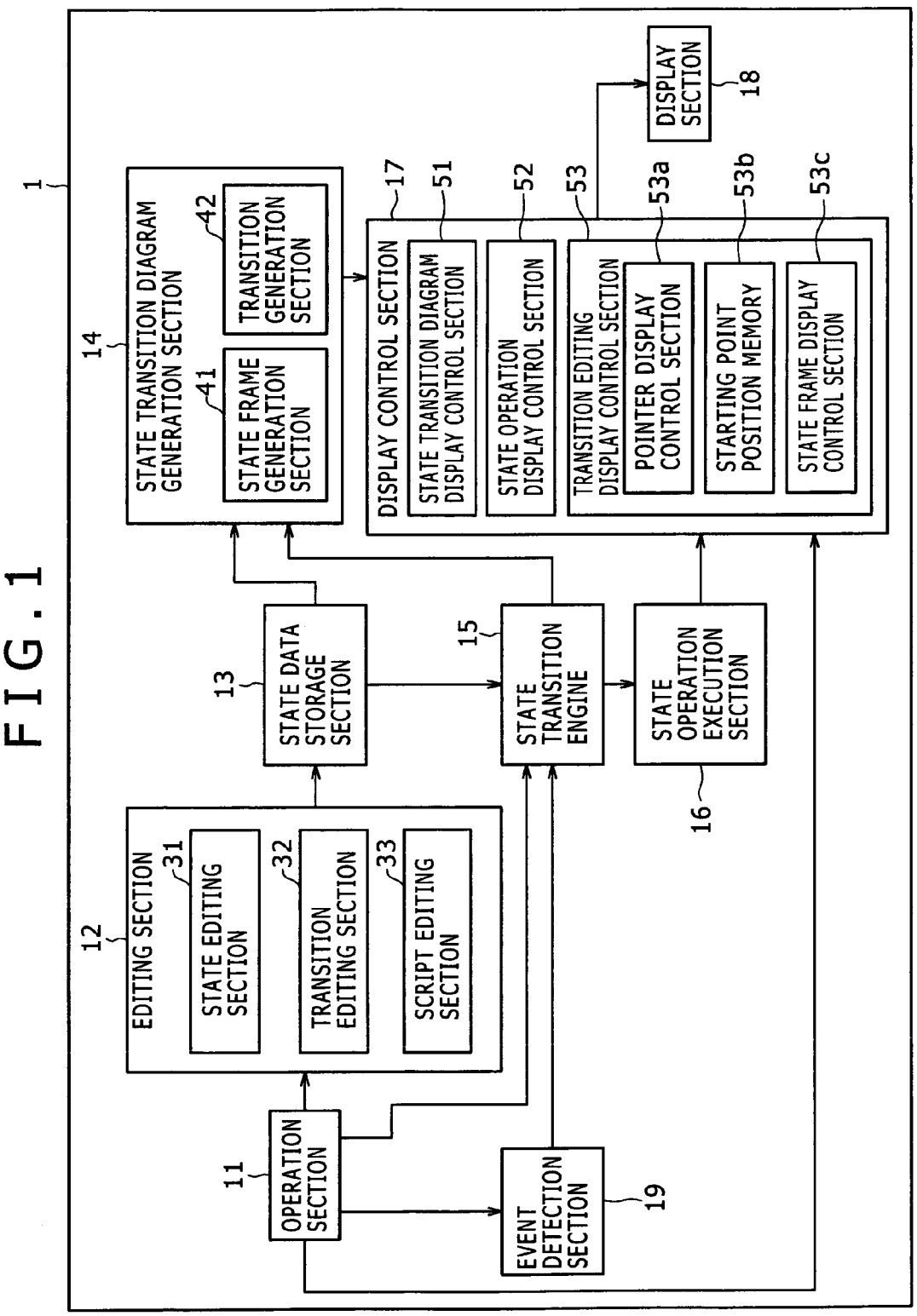
FIG. 1 is a diagram illustrating the structure of a state transition program editing apparatus according to one embodiment of the present invention.

Hereinafter, an embodiment of the present invention will be described. Correspondence between the constituent features of the present invention and the embodiment that will be described in a detailed description of the present invention as presented below is exemplified as follows. Note that this preliminary description is meant to confirm that an embodiment that supports the present invention is described in the detailed description of the present invention. Therefore, even if there is an embodiment that is described in the detailed description of the present invention but not described in this preliminary description as corresponding to a constituent feature of the present invention, that does not mean that that embodiment does not correspond to that constituent feature. Conversely, even if a certain embodiment is described in this preliminary description as corresponding to a certain constituent feature of the present invention, that does not mean that the certain embodiment does not correspond to any other constituent feature.

An information processing method and a program according to certain embodiments of the present invention include a generating step for generating a state transition diagram based on state transition information including information of operations to be performed in respective states, events that trigger transitions in the respective states, and transition destination states of the respective events (e.g., steps S121 to S123 in FIG. 9). The information processing method and a program further includes a displaying step for displaying the state transition diagram generated by a process of the generating step (e.g., steps S169 and S173 in FIG. 13); and a manipulating step for manipulating the state transition diagram displayed by a process of the displaying step (e.g., step S164 and S170 in FIG. 13). The information processing method and a program still further includes a updating step for updating the state transition information in accordance with how the state transition diagram has been manipulated by a process of the manipulating step (e.g., step S46 in FIG. 6); and a storing step for storing a position of a state designated as a transition starting state by the process of the manipulating step (e.g., step S167 in FIG. 13). When the position of the transition starting state has been specified by the process of the manipulating step (e.g., step S164 in FIG. 13), the process of the displaying step displays as a pointer an icon indicating that the position of the transition starting state has been specified by the process of the manipulating step (e.g., step S169 in FIG. 13). When a position of a transition destination state has been specified by the process of the manipulating step, the process of the displaying step displays a first transition directed from the transition starting state stored by a process of the storing step toward the transition destination state (e.g., step S173 in FIG. 13), and a process of the updating step adds information of the first transition to the state transition information, thereby updating the state transition information (e.g., step S46 in FIG. 6).

When the position of the transition starting state has been specified by the process of the manipulating step (e.g., step S164 in FIG. 13), the process of the displaying step may display a second transition joining the pointer with the position of the transition starting state specified by the process of the manipulating step.

An information processing apparatus according to another embodiment of the present invention includes generation means (e.g., a state transition diagram generation section 14 in FIG. 1) for generating a state transition diagram based on state transition information including information of operations to be performed in respective states, events that trigger transitions in the respective states, and transition destination states of the respective events. The information processing apparatus further includes: display means (e.g., a display section 18 in FIG. 1) for displaying the state transition diagram generated by the generation means; and manipulation means (e.g., an operation section 11 in FIG. 1) for manipulating the state transition diagram displayed by the display means. The information processing apparatus still further includes: update means (e.g., an editing section 12 in FIG. 1) for updating the state transition information in accordance with how the state transition diagram has been manipulated by the manipulation means; and storage means (e.g., a starting point position memory 53b in FIG. 1) for storing a position of a state designated as a transition starting state by the manipulation means. When the position of the transition starting state has been specified by the manipulation means, the display means (e.g., the display section 18 in FIG. 1) displays as a pointer an icon indicating that the position of the transition starting state has been specified by the manipulation means. When a position of a transition destination state has been specified by the manipulation means, the display means (e.g., the display section 18 in FIG. 1) displays a first transition directed from the transition starting state stored by the storage means toward the transition destination state, and the update means (e.g., the editing section 12 in FIG. 1) adds information of the first transition to the state transition information, thereby updating the state transition information.

As described above, when performing transition editing by drawing a transition that joins the transition starting state with the transition destination state, for example, there is no need to manipulate the operation section 11 so that the pointer is dragged from the transition starting state to the transition destination state. The ability to recognize the transition starting state enables a user to perform the transition editing accurately and easily. Therefore, improvement of efficiency in development of a UI program is achieved.

FIG. 1 is a diagram illustrating the structure of a "state transition program editing apparatus" 1 according to one embodiment of the present invention.

The state transition program editing apparatus 1 is an editing apparatus designed for development of a UI program in an application software program. The state transition program editing apparatus 1 generates a state transition diagram based on state transition information (i.e., state data) that includes information of an operation to be executed in each state, an event that triggers a transition in each state, and a transition destination state of each event (i.e., a state to which the event causes a transition), and displays the generated state transition diagram. Further, when the displayed state transition diagram is manipulated and altered by a user, the state transition program editing apparatus 1 updates the state transition information so as to reflect the altered state transition diagram.

An operation section 11 is formed by a mouse, a keyboard, or the like. The operation section 11 generates a signal corresponding to an operation by the user who operates the state transition program editing apparatus 1 and supplies the signal to an editing section 12.

The editing section 12 is composed of a state editing section 31, a transition editing section 32, and a script editing section 33. The editing section 12 edits the state transition information (i.e., the state data) based on the signal supplied from the operation section 11. In the state data are described information of the operation to be executed in each state (i.e., script information) and information of a transition destination state of each event (i.e., transition information).

The state editing section 31 creates a new state and also edits information of a display position, size, etc., of a state frame and stores the edited information in a state data storage section 13. The transition editing section 32 edits information of the transition destination state of an event that may occur during execution of the operation of a state, and stores the edited information in the state data storage section 13. The script editing section 33 edits information of the operation to be executed in a state and stores the edited information in the state data storage section 13.

The state data storage section 13 stores the state data containing the transition information and script information edited by the editing section 12 on a state-by-state basis, and supplies the state data to a state transition diagram generation section 14 and a state transition engine 15 as necessary.

The state transition diagram generation section 14 is composed of a state frame generation section 41 and a transition generation section 42. The state transition diagram generation section 14 reads the state data from the state data storage section 13 and generates the state transition diagram. The state frame generation section 41 generates a frame (i.e., a state frame) for each state, the frame being circular or rectangular, for example. The state frame generation section 41 also causes the inside of a state frame that represents the current state to be displayed in a different color from those of the other state frames based on information of the current state supplied from the state transition engine 15. The transition generation section 42 generates an arrow that indicates the transition destination state for each event that may occur during the operation of each state.

The state transition engine 15 reads the state data from the state data storage section 13, and also retrieves the current state based on event information supplied from an event detection section 19 and supplies the retrieved information of the current state to the state transition diagram generation section 14 and a state operation execution section 16.

Based on the state data of the current state supplied from the state transition engine 15, the state operation execution section 16 executes the operation of the current state and supplies a result of the execution to a display control section 17.

The display control section 17 is composed of a state transition diagram display control section 51, a state operation display control section 52, and a transition editing display control section 53. The display control section 17 generates a display screen to be displayed on a display section 18 and causes the display section 18 to display the display screen.

Figure 2:
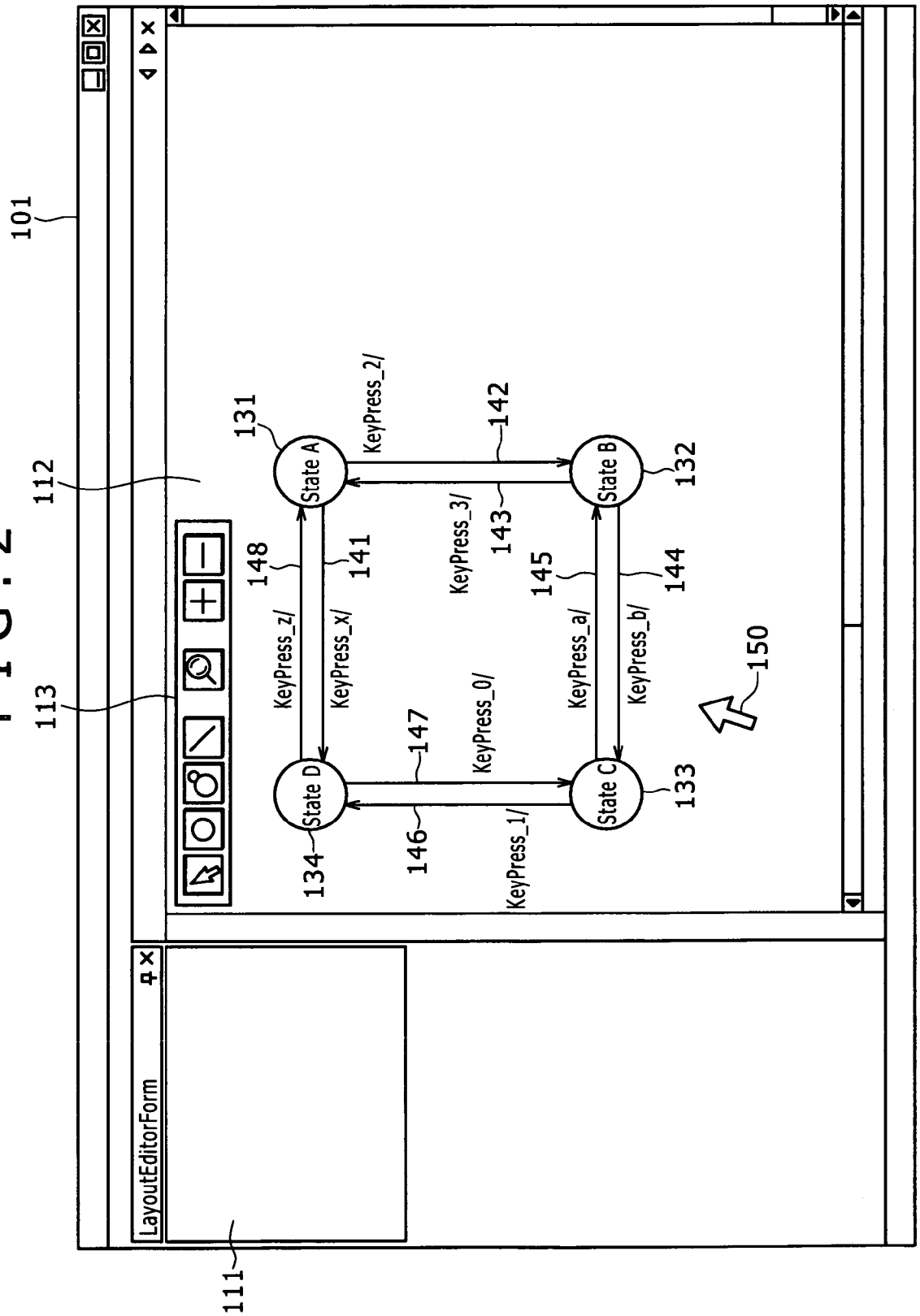
FIG. 2 is a diagram illustrating an exemplary structure of a display window.

Based on information of the state transition diagram supplied from the state transition diagram generation section 14, the state transition diagram display control section 51 generates a state transition diagram display screen 112 and an edition operation button display screen 113 as illustrated in FIG. 2, for example, and performs display control. In FIG. 2, a state frame 131 representing State A, a state frame 132 representing State B, a state frame 133 representing State C, and a state frame 134 representing State D are shown, and all the state frames 131 to 134 are linked by transitions 141 to 148. Each of the transitions 141 to 148 indicates a direction of transition between two states and the corresponding event.

More specifically, the transition 141 is labeled with "Key-Press_x" and the arrow is directed from State A toward State D. The transition 141 indicates that if an event of activation of a key "x" of the operation section 11 occurs while the operation of State A is executed, the transition from State A to State D is triggered.

Similarly, the transition 142 is labeled with "KeyPress_2" and the arrow is directed from State A toward State B. The transition 142 indicates that if an event of activation of a key "2" of the operation section 11 occurs while the operation of State A is executed, the transition from State A to State B is triggered.

Further, the transition 143 is labeled with "KeyPress_3" and the arrow is directed from State B toward State A. The transition 143 indicates that if an event of activation of a key "3" of the operation section 11 occurs while the operation of State B is executed, the transition from State B to State A is triggered.

Still further, the transition 144 is labeled with "Key-Press_b" and the arrow is directed from State B toward State C. The transition 144 indicates that if an event of activation of a key "b" of the operation section 11 occurs while the operation of State B is executed, the transition from State B to State C is triggered.

Still further, the transition 145 is labeled with "Key-Press_a" and the arrow is directed from State C toward State B. The transition 145 indicates that if an event of activation of a key "a" of the operation section 11 occurs while the operation of State C is executed, the transition from State C to State B is triggered.

Still further, the transition 146 is labeled with "Key-Press_1" and the arrow is directed from State C toward State D. The transition 146 indicates that if an event of activation of a key "1" of the operation section 11 occurs while the operation of State C is executed, the transition from State C to State D is triggered.

Still further, the transition 147 is labeled with "Key-Press_0" and the arrow is directed from State D toward State C. The transition 147 indicates that if an event of activation of a key "0" of the operation section 11 occurs while the operation of State D is executed, the transition from State D to State C is triggered.

Still further, the transition 148 is labeled with "Key-Press_z" and the arrow is directed from State D toward State A. The transition 148 indicates that if an event of activation of a key "z" of the operation section 11 occurs while the operation of State D is executed, the transition from State D to State A is triggered.

FIG. 2 shows a display window 101 displayed on the display section 18. The display window 101 is provided with an operation display screen 111 and the state transition diagram display screen 112.

The state operation display control section 52 generates the operation display screen 111 as illustrated in FIG. 2, for example, based on the result of the execution of the operation of the current state supplied from the state operation execution section 16, and performs display control. Note that, in FIG. 2, the operation display screen 111 is black (i.e., blank) because the current state is not set and therefore no operation is executed.

The transition editing display control section 53 controls the display of a pointer, which is manipulated using the operation section 11, any of the transitions, and any of the state frames when the user operates the operation section 11 to edit any of the transitions on the state transition diagram, which is being displayed on the display section 18 under the control of the state transition diagram display control section 51. More specifically, instead of controlling the display of any transition based on the state data edited by the transition editing section 32 and stored in the state data storage section 13, the transition editing display control section 53 controls the display of any transition on the state transition diagram, which is supplied from the state transition diagram generation section 14 and generated by the state transition diagram display control section 51 to be displayed on the display section 18. Therefore, the transition editing display control section 53 controls the display of the pointer, any of the transitions, and any of the state frames on the state transition diagram during the edition and prior to update of the state data stored in the state data storage section 13.

The transition editing display control section 53 includes a pointer display control section 53*a*, a starting point position memory 53*b*, and a state frame display control section 53*c*. The pointer display control section 53*a* controls the display of the pointer during the edition of any transition. The starting point position memory 53*b* stores a state frame that is set as a starting point of a transition and the position of the state frame in accordance with an operation of the operation section 11. The state frame display control section 53*c* controls the display of any state frame during the edition of any transition.

The display section 18 is formed by a cathode ray tube (CRT) display, a liquid crystal display (LCD), or the like. The display section 18 displays screens generated by the display control section 17.

The event detection section 19 detects an event in accordance with an operation of the operation section 11 and supplies the detected event to the state transition engine 15. The event detection section 19 detects not only an event according to the operation of the operation section 11 but also an event independent of the operation of the operation section 11, such as an event of the remaining amount of charge in a battery (not shown) becoming less than a predetermined value.

Next, with reference to FIG. 3, state information (i.e., the state data) stored in the state data storage section 13 will now be described.

Figure 3:
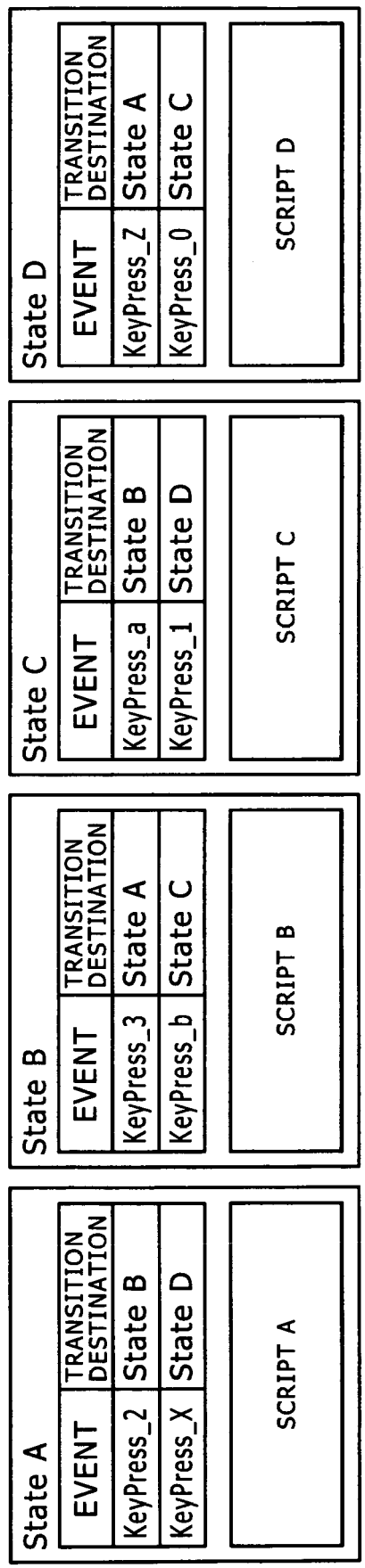
FIG. 3 illustrates data structure of state information stored in a state data storage section.

In the case where the state transition diagram as illustrated in the state transition diagram display screen 112 of FIG. 2 is formed, for example, the state information stored in the state data storage section 13 has a format as illustrated in FIG. 3 and is provided for each of States A to D. In FIG. 3, the data structures of the state information of States A to D are shown in alphabetical order with that of State A on the left-hand side.

For each of the states is secured a storage region in which information of an event and a transition destination state associated with the event is stored as the transition information. In addition, for each of the states is also secured a storage region in which a script for the state is stored.

Specifically, as illustrated in FIG. 3, for State A, as the transition information, "KeyPress_2" and "KeyPress_x" are stored in an event column and their respective transition destination states "State B" and "State D" are also stored so as to be associated therewith. That is, this transition information corresponds to the transitions 142 and 141 as illustrated in FIG. 2. In addition, in the case of State A, "Script A" is stored as the script information below the transition information.

For State B, as the transition information, "KeyPress_3" and "KeyPress_b" are stored in the event column and their respective transition destination states "State A" and "State C" are also stored so as to be associated therewith. That is, this transition information corresponds to the transitions 143 and 144 as illustrated in FIG. 2. In addition, in the case of State B, "Script B" is stored as the script information below the transition information.

For State C, as the transition information, "KeyPress_a" and "KeyPress_1" are stored in the event column and their respective transition destination states "State B" and "State D" are also stored so as to be associated therewith. That is, this transition information corresponds to the transitions 145 and 146 as illustrated in FIG. 2. In addition, in the case of State C, "Script C" is stored as the script information below the transition information.

For State D, as the transition information, "KeyPress_z" and "KeyPress_0" are stored in the event column and their respective transition destination states "State A" and "State C" are also stored so as to be associated therewith. That is, this transition information corresponds to the transitions 148 and 147 as illustrated in FIG. 2. In addition, in the case of State D, "Script D" is stored as the script information below the transition information.

Figure 4:
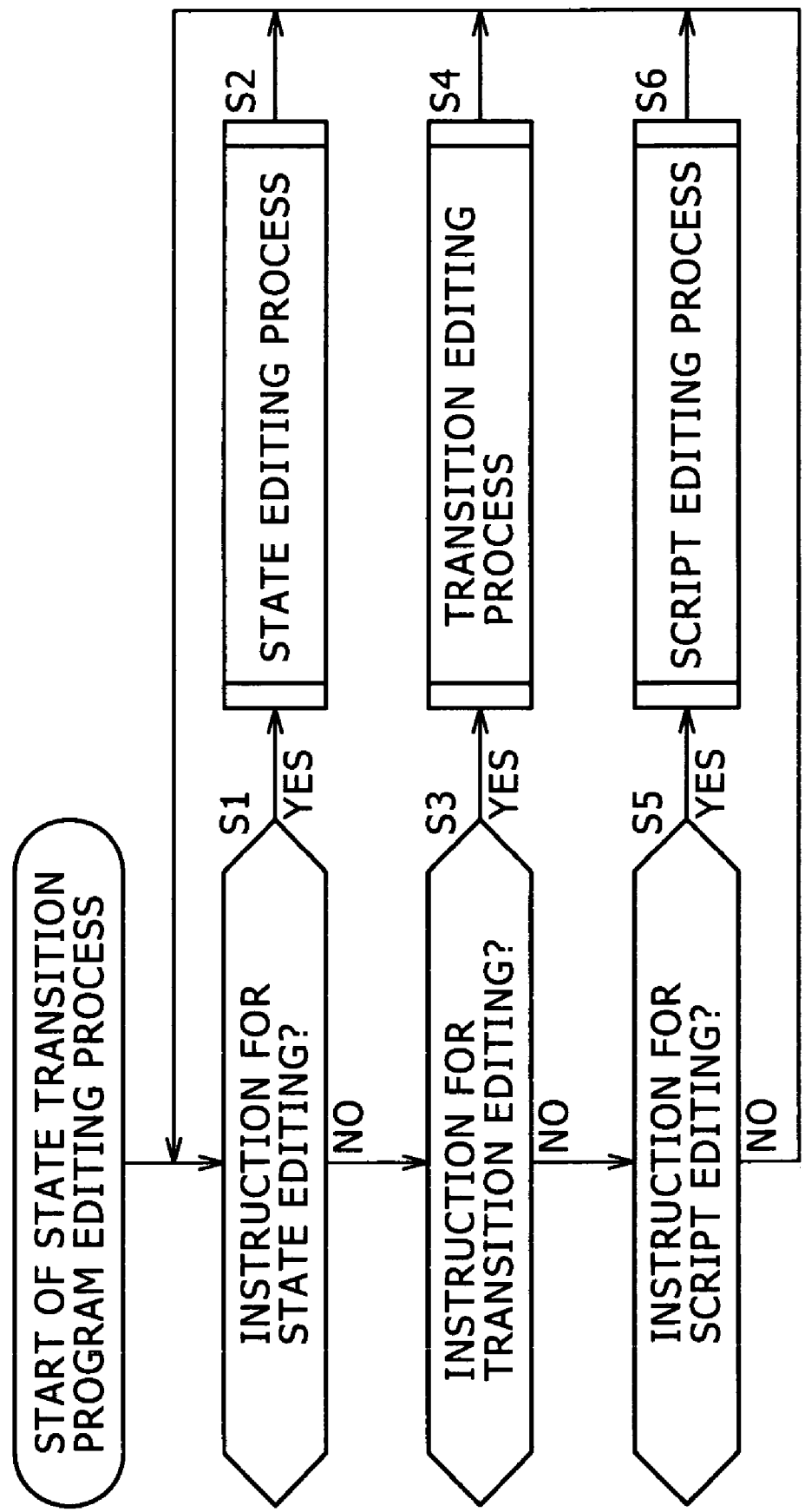
FIG. 4 is a flowchart for explaining a state transition program editing process performed by the state transition program editing apparatus of FIG. 1.

Next, a state transition program editing process performed by the editing section 12 will now be described with reference to a flowchart of FIG. 4.

At step S1, the state editing section 31 determines whether or not an instruction for state editing has been issued based on the signal supplied from the operation section 11. If it is determined at step S1 that the instruction for state editing has been issued, the state editing section 31 performs a state editing process at step S2, and then control returns to step S1. The state editing process will be described later with reference to FIG. 5.

If it is determined at step S1 that the instruction for state editing has not been issued, the transition editing section 32 determines at step S3 whether or not an instruction for transition editing has been issued based on the signal supplied from the operation section 11. If it is determined at step S3 that the instruction for transition editing has been issued, the transition editing section 32 performs a transition editing process at step S4, and then control returns to step S1. The transition editing process will be described later with reference to FIG. 6.

If it is determined at step S3 that the instruction for transition editing has not been issued, the script editing section 33 determines at step S5 whether or not an instruction for script editing has been issued based on the signal supplied from the operation section 11. If it is determined at step S5 that the instruction for script editing has been issued, the script editing section 33 performs a script editing process at step S6, and then control returns to step S1. The script editing process will be described later with reference to FIG. 7.

As a result of the above procedure, the state data is updated, and therefore, a relevant state transition program is updated.

Figure 5:
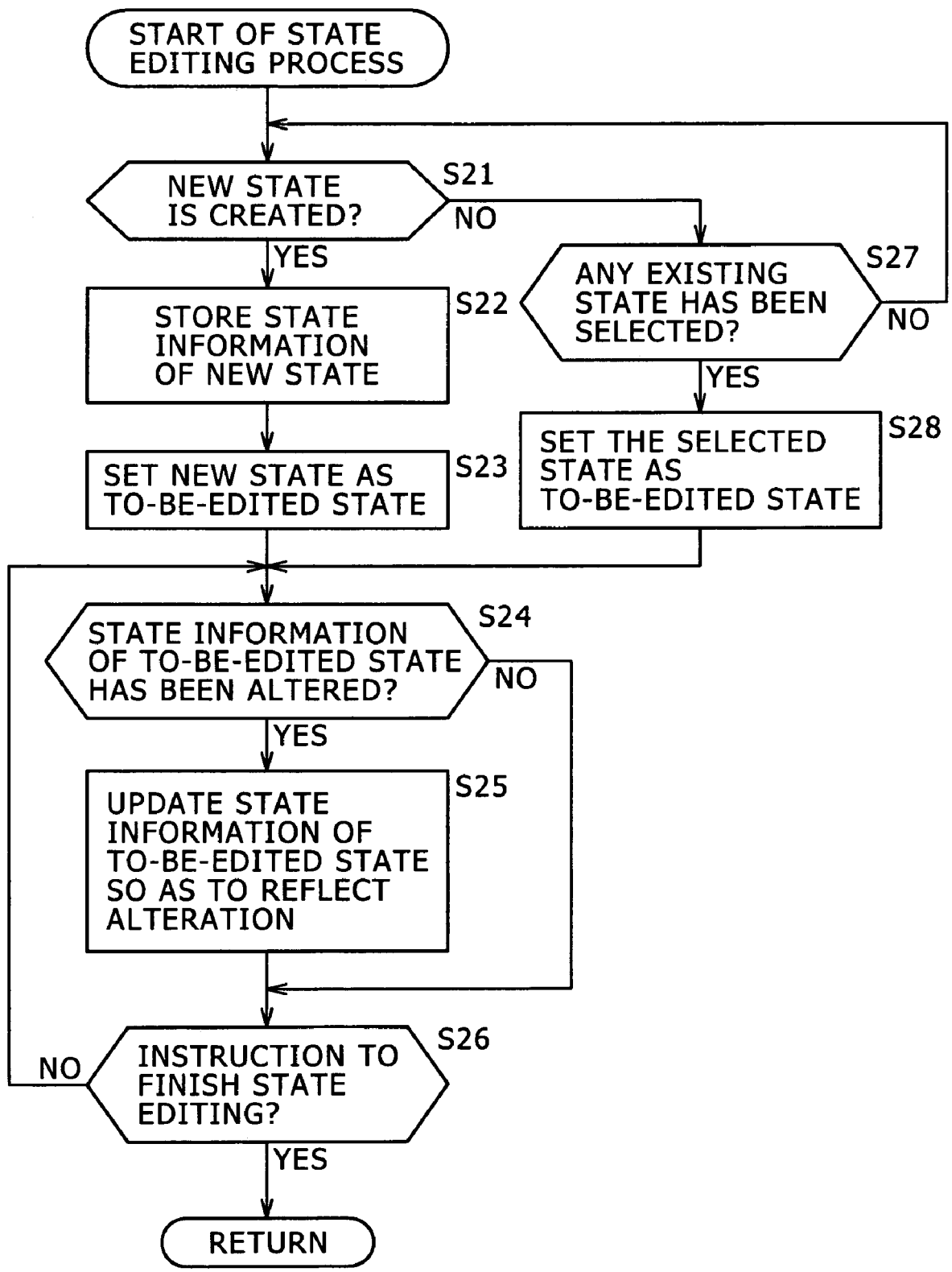
FIG. 5 is a flowchart for explaining a state editing process performed by the state transition program editing apparatus of FIG. 1.

Next, the state editing process will be described with reference to a flowchart of FIG. 5.

At step S21, based on the signal supplied from the operation section 11, the state editing section 31 determines whether or not an instruction for a process of creating a new state has been issued. If, for example, a button (not shown) on the display window 101 of FIG. 2 is activated to issue the instruction for the process of generating a new state, the state editing section 31 creates a new state at step S22. That is, the state editing section 31 stores state information corresponding to the new state in the state data storage section 13.

At step S23, the state editing section 31 sets the new state as a to-be-edited state.

At step S24, the state editing section 31 determines whether or not the state information of the to-be-edited state is to be updated. Note that, at this time, the state editing section 31 only determines whether or not updating of a state name or the display position of the corresponding state frame should be performed and does not care any other information contained in the state information. That is, of the state information, the state editing section 31 edits only information of the state name and the display position of the state frame.

If it is determined at step S24 that the information of the state name or the display position of the state frame is to be updated, the state editing section 31 updates the state information of the to-be-edited state so as to reflect a new state name or a new display position of the state frame at step S25.

Meanwhile, if it is determined at step S24 that no such update is to be performed, the process of step S25 is skipped.

It is determined at step S26 whether an instruction to finish the state editing process has been issued. If it is determined that the instruction to finish the state editing process has not been issued, control returns to step S24, whereas if it is determined that the instruction to finish the state editing process has been issued, the state editing process is finished.

Meanwhile, if it is determined at step S21 that the instruction for creating a new state has not been issued, it is determined at step S27 whether or not any existing state has been selected. Specifically, based on whether or not any one of the existing state frames 131 to 134 displayed on the state transition diagram display screen 112 as illustrated in FIG. 2 (which is displayed by a display process, which will be described later with reference to FIG. 10) has been selected by manipulating the pointer 150 using the operation section 111, it is determined whether the state information of any one of States A to D stored in the state data storage section 13 has been selected. If it is determined that any existing state has been selected, the state editing section 31 sets the selected state as the to-be-edited state at step S28, and then control proceeds to step S24.

Meanwhile, if it is determined at step S27 that no existing state has been selected, control returns to step S21. Then, the succeeding processes are repeated.

As a result of the above-described state editing process, the state name and display position of the state frame of the newly created state are set, or the state name and display position of the state frame of any existing state are updated.

Figure 6:
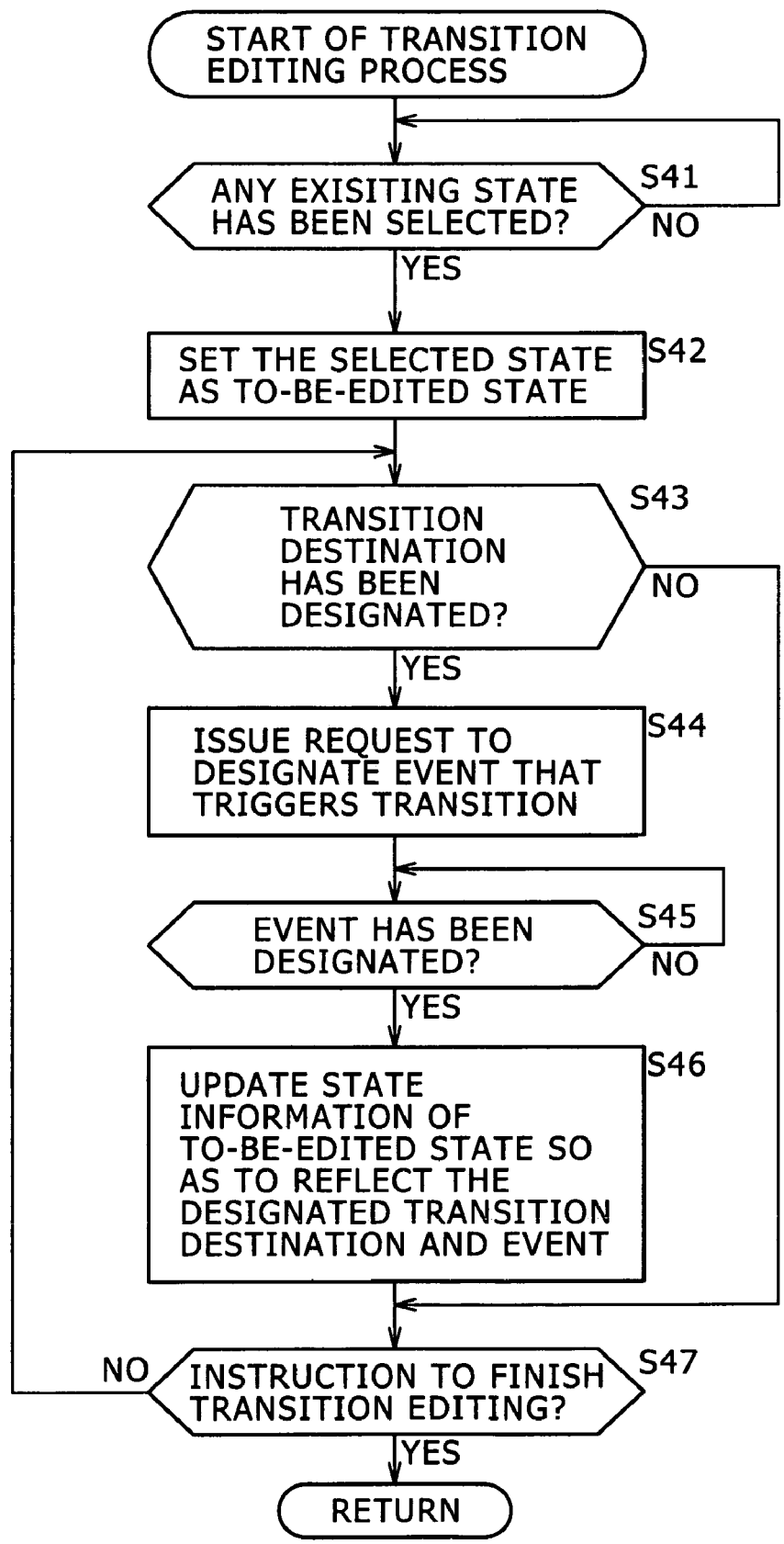
FIG. 6 is a flowchart for explaining a transition editing process performed by the state transition program editing apparatus of FIG. 1.

Next, the transition editing process will be described with reference to a flowchart of FIG. 6.

At step S41, the transition editing section 32 determines whether or not any existing state has been selected. This process is repeated until any existing state is selected. Specifically, based on whether or not any one of the existing state frames 131 to 134 displayed on the state transition diagram display screen 112 as illustrated in FIG. 2 (which is displayed by the display process, which will be described later with reference to FIG. 10) has been selected by manipulating the pointer 150 using the operation section 111, it is determined whether or not the state information of any one of States A to D stored in the state data storage section 13 has been selected. If it is determined at step S41 that any existing state has been selected, the transition editing section 32 sets the selected state as a to-be-edited state at step S42, and then control proceeds to step S43.

At step S43, the transition editing section 32 determines whether or not, in connection with the state information of the to-be-edited state, the transition destination state of the to-be-edited state has been designated. Specifically, suppose, for example, that State A has been selected among the States A to D which is respectively represented by the state frames 131 to 134 as a transition starting state and set as the to-be-edited state. In this case, if the state frame 134 of State D is set as the transition destination state, an arrow as represented by the transition 141 is drawn by a transition editing display process, as illustrated in the state transition diagram display screen 112 of FIG. 2. The transition editing display process will be described later with reference to a flowchart of FIG. 13.

As such, in step S43, the transition editing section 32 determines whether or not the transition destination state has been set based on whether or not such an arrow representing a transition has been drawn from the state frame representing the to-be-edited state toward the state frame of the transition destination state.

If it is determined at step S43 that the transition destination state has been set, the transition editing section 32 issues a request to designate an event at step S44. More specifically, in the case where the transition 141 as illustrated in FIG. 2 has been drawn using the pointer 150 as a result of the process of designating the transition destination state, for example, the transition editing section 32 causes a blank space (not shown) for designation of an event to be displayed beside the transition 141 and prompts the user to enter the event therein.

At step S45, the transition editing section 32 determines whether or not the event that triggers the transition has been designated. This process is repeated until it is determined that the event has been designated. Specifically, the transition editing section 32 determines whether or not information that designates the event has been entered in the blank space and thereby determines whether the event has been designated.

If it is determined at step S45 that the event has been designated, the transition editing section 32 accesses the state data storage section 13 to read the state information of the to-be-edited state and updates the state information so as to reflect the information of the designated transition destination state and event at step S46. Specifically, in the case of the transition 141 as illustrated in FIG. 2, for example, "State D" is designated as the transition destination state and "KeyPress_x" is designated as the event; therefore, as illustrated in the left-hand side of FIG. 3, "State D" and "KeyPress_x" are added to the transition destination and event columns, respectively, whereby the update of the state information is achieved.

If it is determined at step S43 that the transition destination state has not been designated, the processes of steps S44 to S46 are skipped and then, at step S47, it is determined whether or not an instruction to finish the transition editing process has been issued. If it is determined that the instruction to finish the transition editing process has not been issued, control returns to step S43. In other words, the processes of steps S43 to S47 are repeated until the instruction to finish the transition editing process is issued.

If it is determined at step S47 that the instruction to finish the transition editing process has been issued, the transition editing process is finished.

According to the above-described transition editing process, the edition of the transition information is achieved by manipulating the pointer 150 using the operation section 111.

Figure 7:
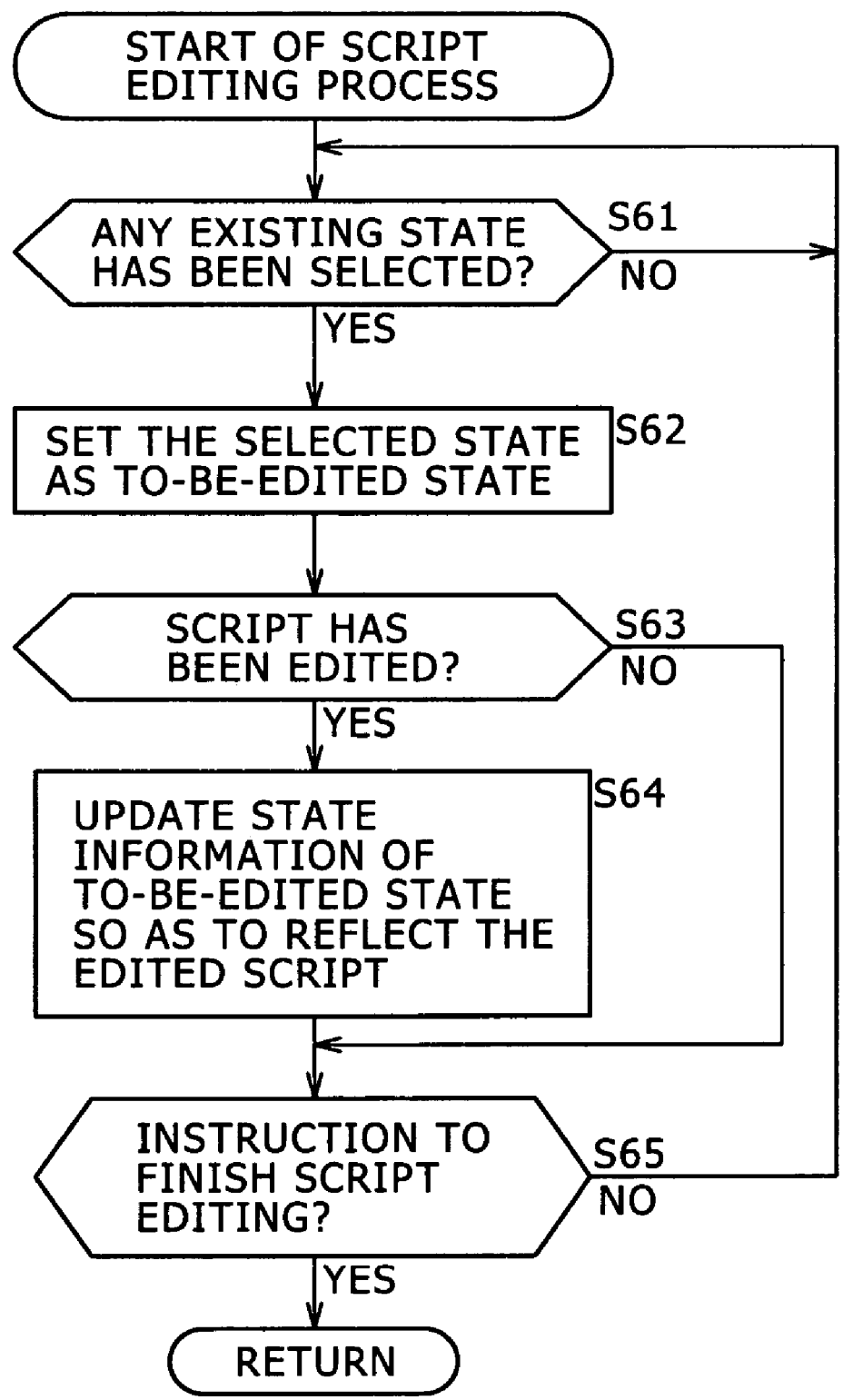
FIG. 7 is a flowchart for explaining a script editing process performed by the state transition program editing apparatus of FIG. 1.

Next, the script editing process will be described with reference to a flowchart of FIG. 7.

At step S61, the script editing section 33 determines whether or not any existing state has been selected. This process is repeated until any existing state is selected. Specifically, based on whether or not any one of the existing state frames 131 to 134 displayed on the state transition diagram display screen 112 as illustrated in FIG. 2 (which is displayed by the display process, which will be described later with reference to FIG. 10) has been selected by manipulating the pointer 150 using the operation section 111, it is determined whether or not the state information of any one of States A to D stored in the state data storage section 13 has been selected. If it is determined at step S61 that any existing state has been selected, the script editing section 33 sets the selected state as a to-be-edited state at step S62, and then control proceeds to step S63.

At step S63, the script editing section 33 determines whether or not the script of the to-be-edited state has been edited. The script is determined to have been edited, for example, when an editor (not shown) is activated and the script is edited by operating the operation section 11. Then, at step S64, the script editing section 33 accesses the state data storage section 13 to read the state information of the to-be-edited state, and updates the state information by reflecting the edited script.

At step S65, the script editing section 33 determines whether or not an instruction to finish the script editing process has been issued. If it is determined that the instruction to finish the script editing process has not been issued, control returns to step S61. Meanwhile, if it is determined that the instruction to finish the script editing process has been issued, the script editing process is finished.

According to the above-described script editing process, the edition of the script is achieved.

Figure 8:
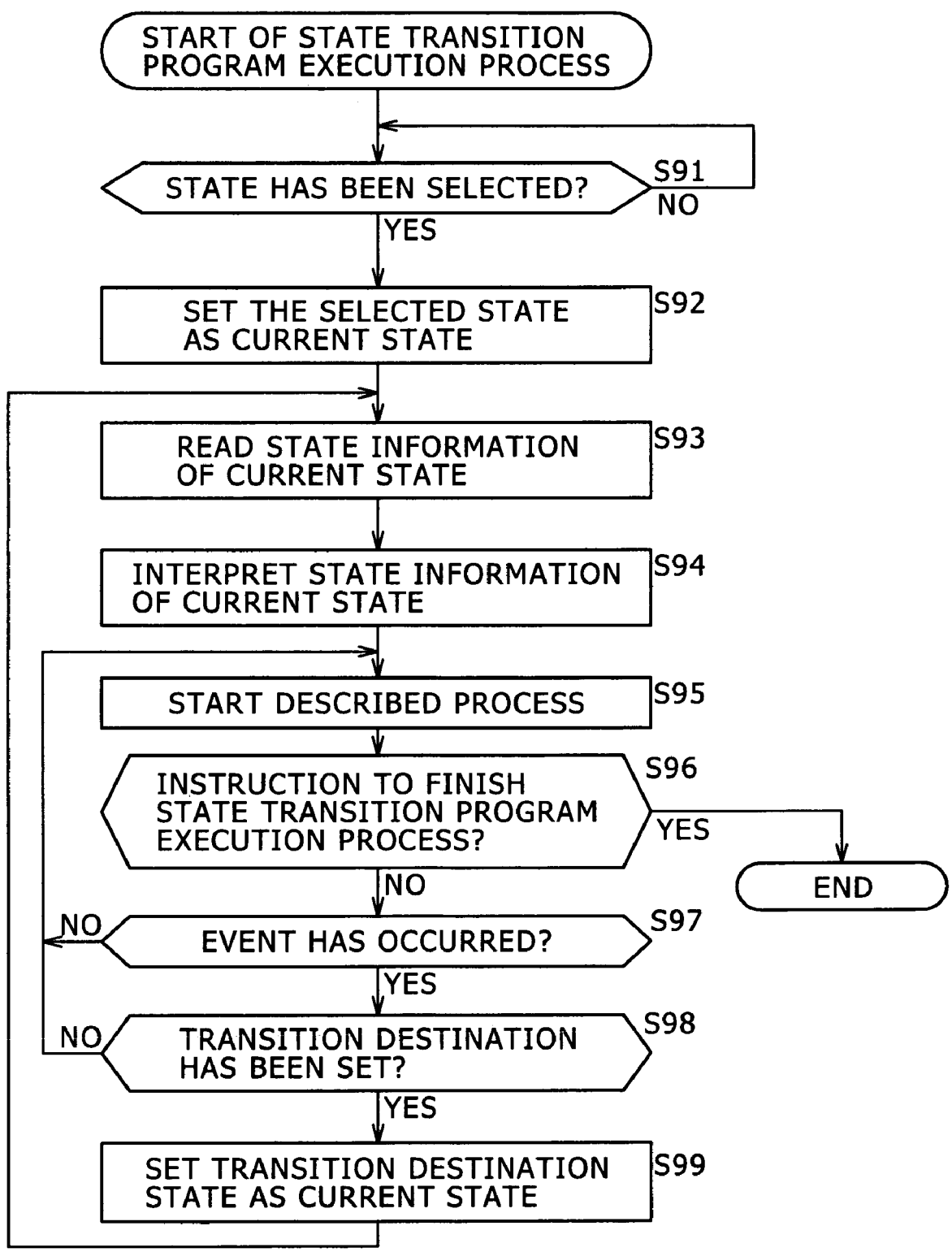
FIG. 8 is a flowchart for explaining a state transition program execution process performed by the state transition program editing apparatus of FIG. 1.

Next, a state transition program execution process will now be described with reference to a flowchart of FIG. 8.

At step S91, based on an operation signal sent from the operation section 11, the state transition engine 15 determines whether or not any state on the state transition diagram display screen 112 has been selected. This process is repeated until any state is selected. More specifically, based on the signal supplied from the operation section 11, the state transition engine 15 determines whether or not any one of the state frames 131 to 134 on the state transition diagram display screen 112 as illustrated in FIG. 2 has been selected using the pointer 150, for example. This process is repeated until any state is selected.

If it is determined at step S91 that any state has been selected, the state transition engine 15 sets the selected state as a current state at step S92. That is, based on the signal supplied from the operation section 11, the state transition engine 15 sets as the current state the state corresponding to the state frame selected by the pointer 150 from among the state frames 131 to 134 on the state transition diagram display screen 112 as illustrated in FIG. 2. At this time, the state transition engine 15 supplies information indicating which state is the current state to the state transition diagram generation section 14. Based on this information, the state frame of the current state is displayed with a different display color from those of the other state frames according to a state transition diagram generation process, which will be described later with reference to a flowchart of FIG. 9.

At step S93, the state transition engine 15 accesses the state data storage section 13 to read the state information of the current state, and supplies the state information to the state operation execution section 16.

At step S94, the state operation execution section 16 interprets the supplied state information of the current state. Specifically, the state operation execution section 16 reads, of the supplied state information of the current state, the script information in particular and recognizes the operation to be executed in the state.

At step S95, the state operation execution section 16 executes a process described in the script information.

At step S96, the state operation execution section 16 determines whether or not an instruction to finish a state transition program execution process has been issued. Specifically, based on the signal supplied from the operation section 11, the state operation execution section 16 determines whether or not the instruction to finish the state transition program execution process has been issued. If it is determined that the instruction to finish the state transition program execution process has not been issued, control proceeds to step S97.

At step S97, the state transition engine 15 determines whether or not any event has occurred. Specifically, the state transition engine 15 determines whether or not information of any detected event has been supplied from the event detection section 19. If it is determined that no event has occurred, control returns to step S95. In other words, the processes of steps S95 to S97 are repeated until occurrence of any event is detected. Meanwhile, if it is determined at step S97 that any event has occurred, control proceeds to step S98.

At step S98, based on the supplied information of the detected event, the state transition engine 15 determines whether the transition destination state is set for the detected event. Suppose, for example, that the state information is such as illustrated in FIG. 3 and the current state is State A. In this case, if the event of the activation of the key "A" of the keyboard of the operation section 11 occurs and is detected, for example, it is determined that the transition destination state is not set for the detected event. Therefore, in this case, control returns to step S95. In other words, control continues in essence as if no event had occurred.

Meanwhile, if it is determined at step S98 that the transition destination state is set, control proceeds to step S99. Suppose that the state information is such as illustrated in FIG. 3 and the current state is State A. In this case, if the event of the activation of the key "2" of the keyboard of the operation section 11 has occurred and is detected, for example, it is determined that the transition destination state is set for the detected event as State B is set as the transition destination state of that event. Then, at step S99, the state transition engine 15 sets the transition destination state as the current state, and control returns to step S93, then the sequential processes are repeated. In the above example, by the process of step S99, State B is set as a new current state, and control returns to step S93 to repeat the sequential processes.

According to the above-described state transition program execution process, the state transition engine 15 is able to change the current state in accordance with the state transition diagram based on the information of the detected event supplied from the event detection section 19, and is also able to read the state information of the current state and supply the read state information to the state operation execution section 16. In addition, the state operation execution section 16 is able to change the current state based on a user operation and is also able to execute the operation of the current state, the operation being defined by the script of the current state.

Next, the state transition diagram generation process will now be described with reference to the flowchart of FIG. 9.

At step S121, the state transition diagram generation section 14 accesses the state data storage section 13 to read all state information stored therein.

At step S122, for each piece of state information, the state frame generation section 41 generates the state frame to be displayed on the state transition diagram.

At step S123, the transition generation section 42 generates the transition based on the information of the event and the corresponding transition destination state contained in the state information.

At step S124, the state transition diagram generation section 14 generates information for forming the state transition diagram based on the state frame generated by the state frame generation section 41 and the transition generated by the transition generation section 42, and supplies the information to the display control section 17.

According to the above-described state transition diagram generation process, the state transition diagram can be generated based on the state information stored in the state data storage section 13, and the information of the state transition diagram can be supplied to the display control section 17.

Next, the display process will now be described with reference to a flowchart of FIG. 10.

At step S141, the state transition diagram display control section 51 displays the state transition diagram display screen 112 based on the information of the state transition diagram supplied from the state transition diagram generation section 14.

At step S142, the state operation display control section 52 determines whether or not the current state is set based on the information supplied from the state transition diagram generation section 14. If it is determined at step S142 that the current state is set, the state operation display control section 52 displays the operation display screen 111 at step S143 based on the operation of the current state, which is being executed by the state operation execution section 16.

Meanwhile, if it is determined at step S142 that the current state is not set, the process of step S143 is skipped.

At step S144, the transition editing display control section 53 determines whether or not the instruction for transition editing has been issued based on the operation signal supplied from the operation section 11. If it is determined at step S144 that the instruction for transition editing has been issued, the transition editing display control section 53 starts the transition editing display process at step S145, and control returns to step S141. Meanwhile, if it is determined at step S144 that the instruction for transition editing has not been issued, the process of step S145 is skipped.

According to the above-described display process, the display window 101 composed of the operation display screen 111 and the state transition diagram display screen 112 as illustrated in FIG. 2 is displayed on the display section 18. The transition editing display process will be described in detail later with reference to the flowchart of FIG. 13.

As a result of the state transition program editing process of FIG. 4, the state editing process of FIG. 5, the transition editing process of FIG. 6, the script editing process of FIG. 7, the state transition program execution process of FIG. 8, the state transition diagram generation process of FIG. 9, and the display process of FIG. 10, such an operation as described below will be achieved.

Figure 11:
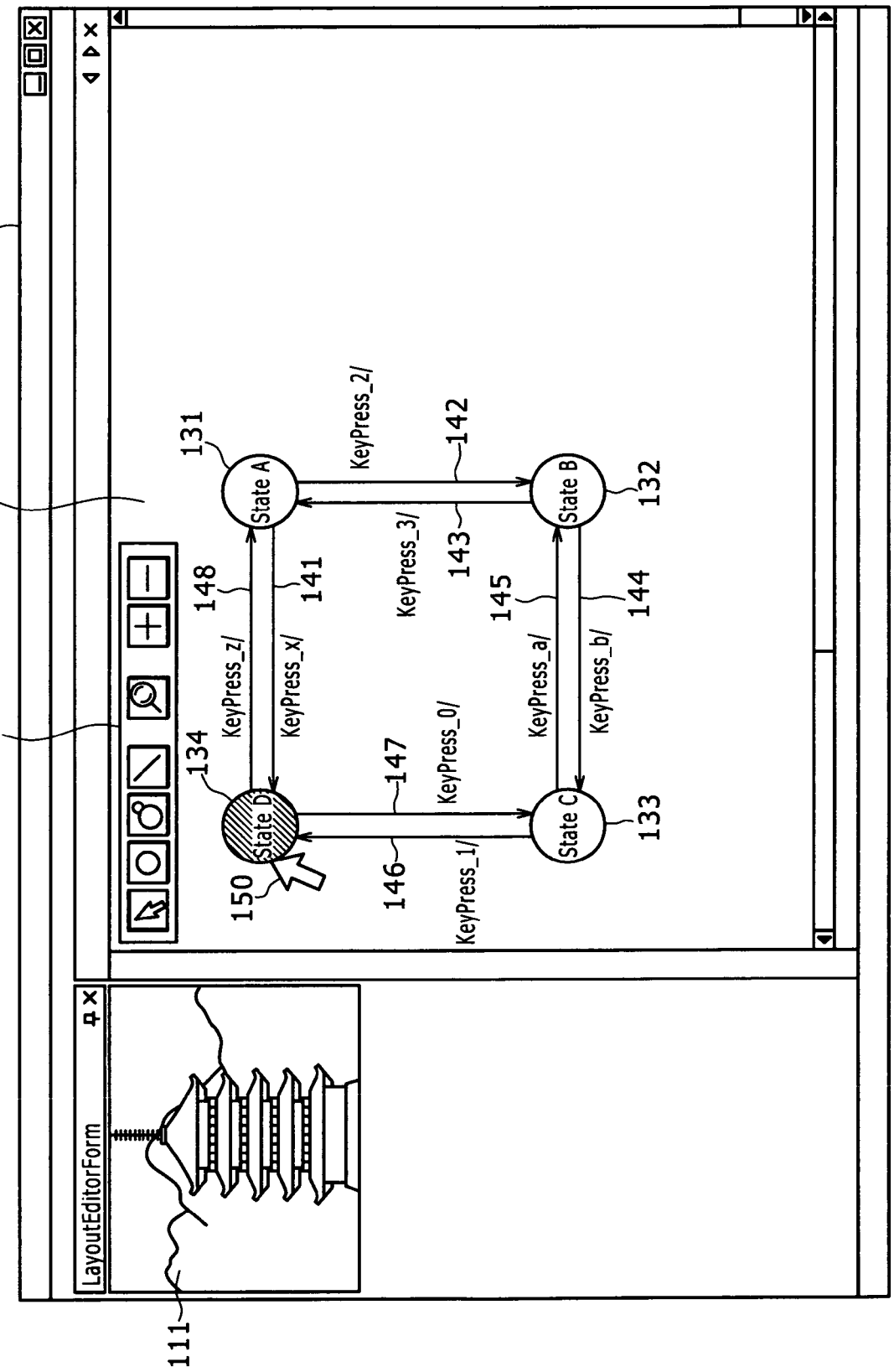
FIGS. 11 and 12 illustrate exemplary display by the display process.
Figure 12:
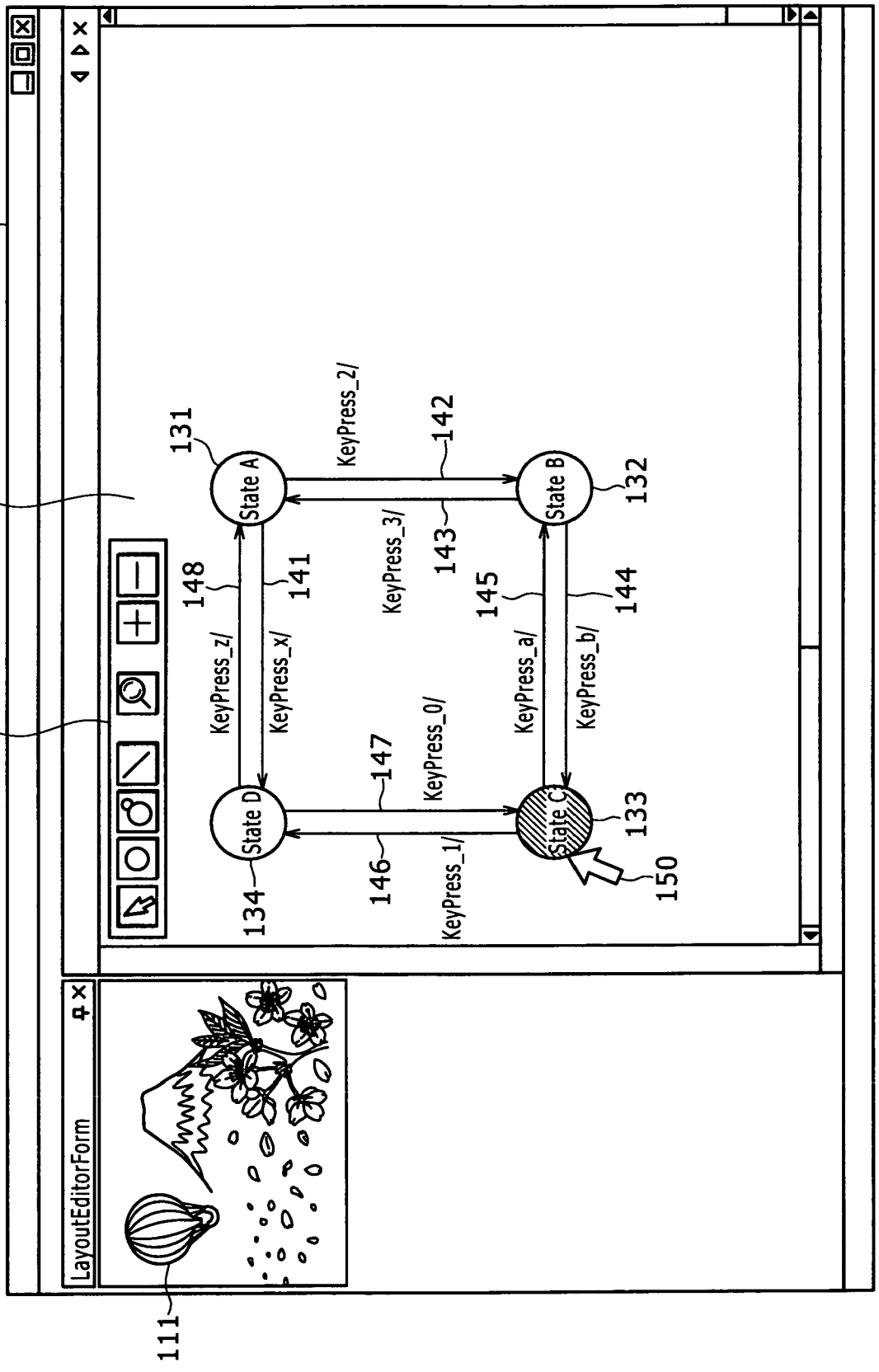

That is, as illustrated in FIG. 11, in the case where the pointer 150 exists over the state frame 134 and State D is set as the current state, the state frame 134 of State D, which is the current state, is filled in with a different color from those of the other state frames, and the operation display screen 111 shows the operation of State D (an image resembling a five-storied pagoda). At this time, if the pointer 150 is moved to the state frame 133 so that the pointer 150 exists over the state frame 133 as illustrated in FIG. 12, the state frame 133 will be filled in with a different color from those of the other state frames because State C is set as the current state. In addition, the operation display screen 111 shows a result of processing in State C, which is the current state.

Figure 13:
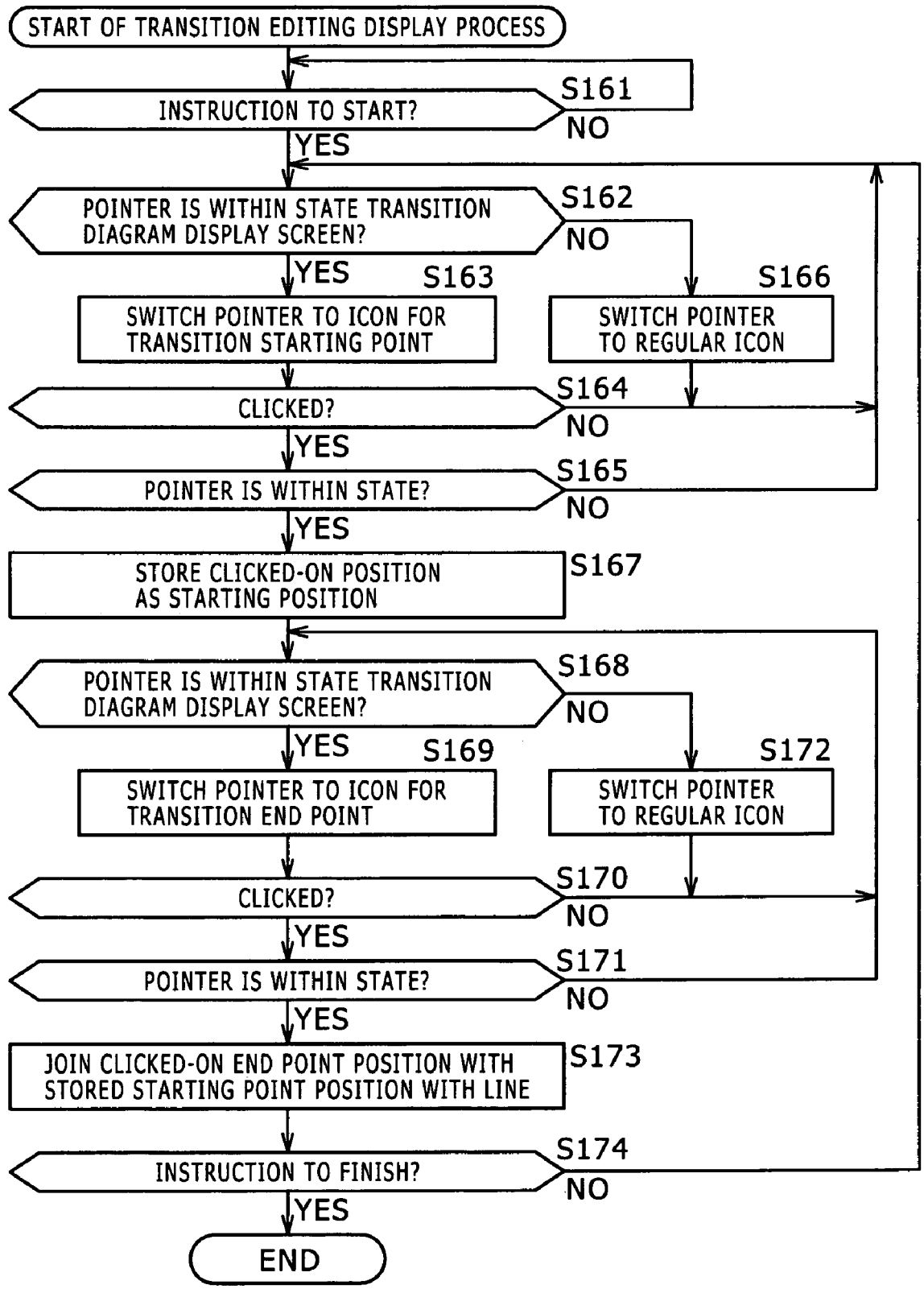
FIG. 13 is a flowchart for explaining a transition editing display process performed by the state transition program editing apparatus of FIG. 1.

Next, the transition editing display process will now be described with reference to the flowchart of FIG. 13.

At step S161, the transition editing display control section 53 determines whether or not an instruction to start transition editing has been issued. This process is repeated until it is determined that the instruction to start the transition editing has been issued. At step S161, issuance of the instruction to start the transition editing is determined, for example, by the process of step S144 of the display process, which has been described above with reference to the flowchart of FIG. 10, issuing the instruction for the transition editing.

Figure 14:
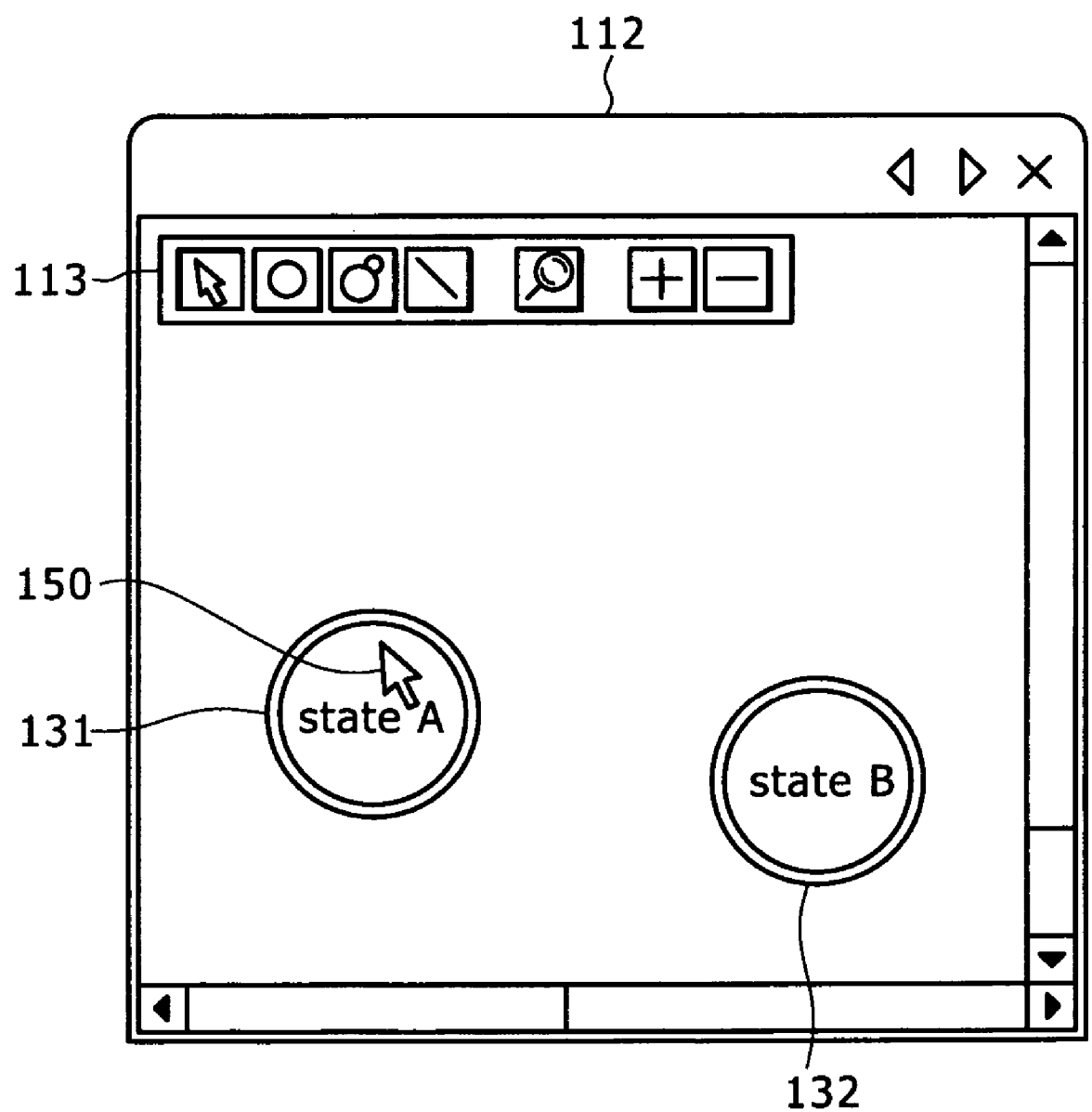
Figure 15:
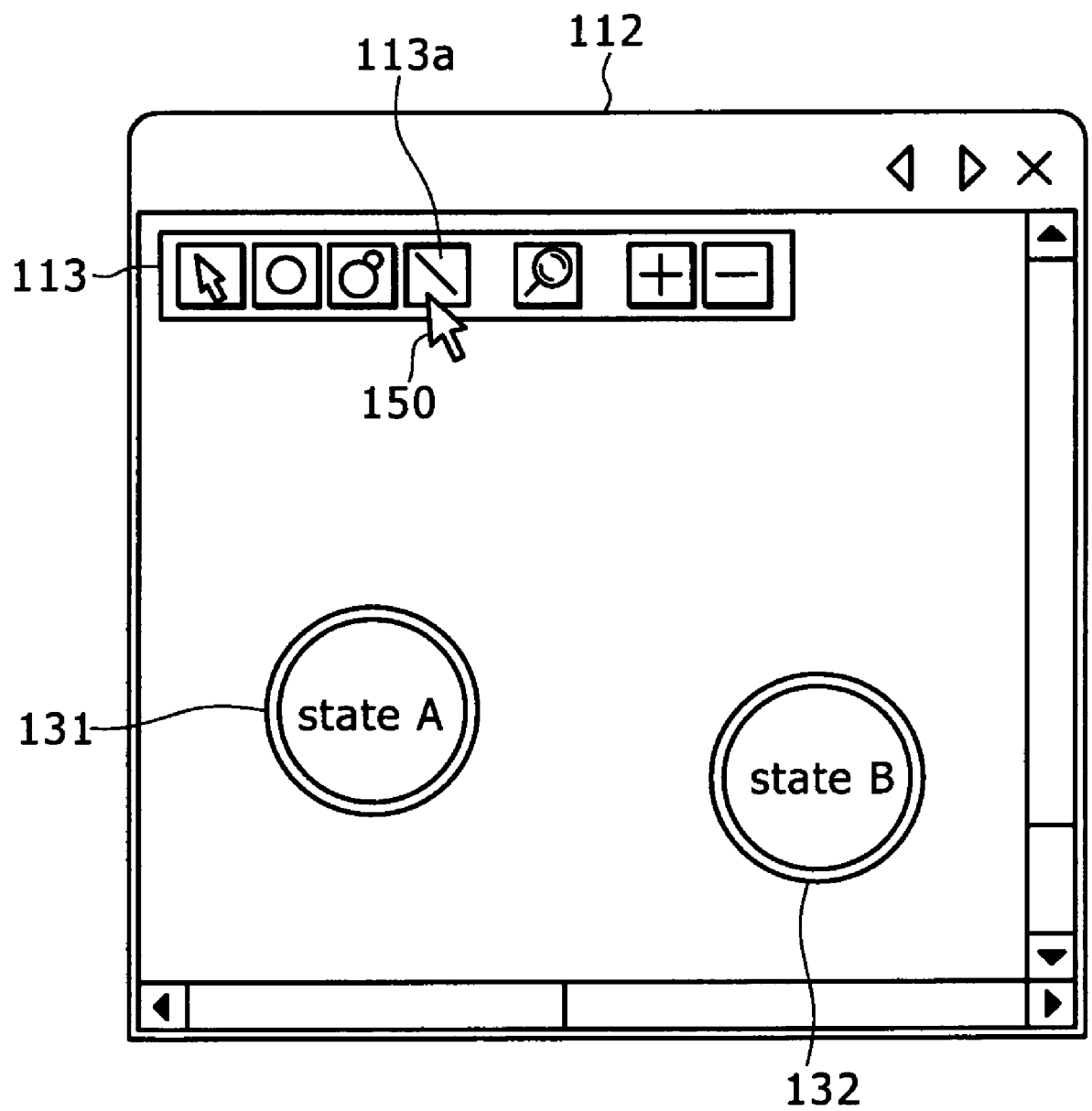

Assume that, in the following description, only the state frames 131 and 132 exist on the state transition diagram display screen 112 as illustrated in FIG. 14, for example. For example, when a button 113a for issuing the instruction for the transition editing provided on the edition operation button display screen 113 is activated using the pointer 150 as illustrated in FIG. 15 and the process of step S144 in the flowchart of FIG. 10 determines that the instruction for the transition editing has been issued, it is determined at step S161 that the instruction to start the transition editing has been issued. Then, control proceeds to step S162.

Figure 16:
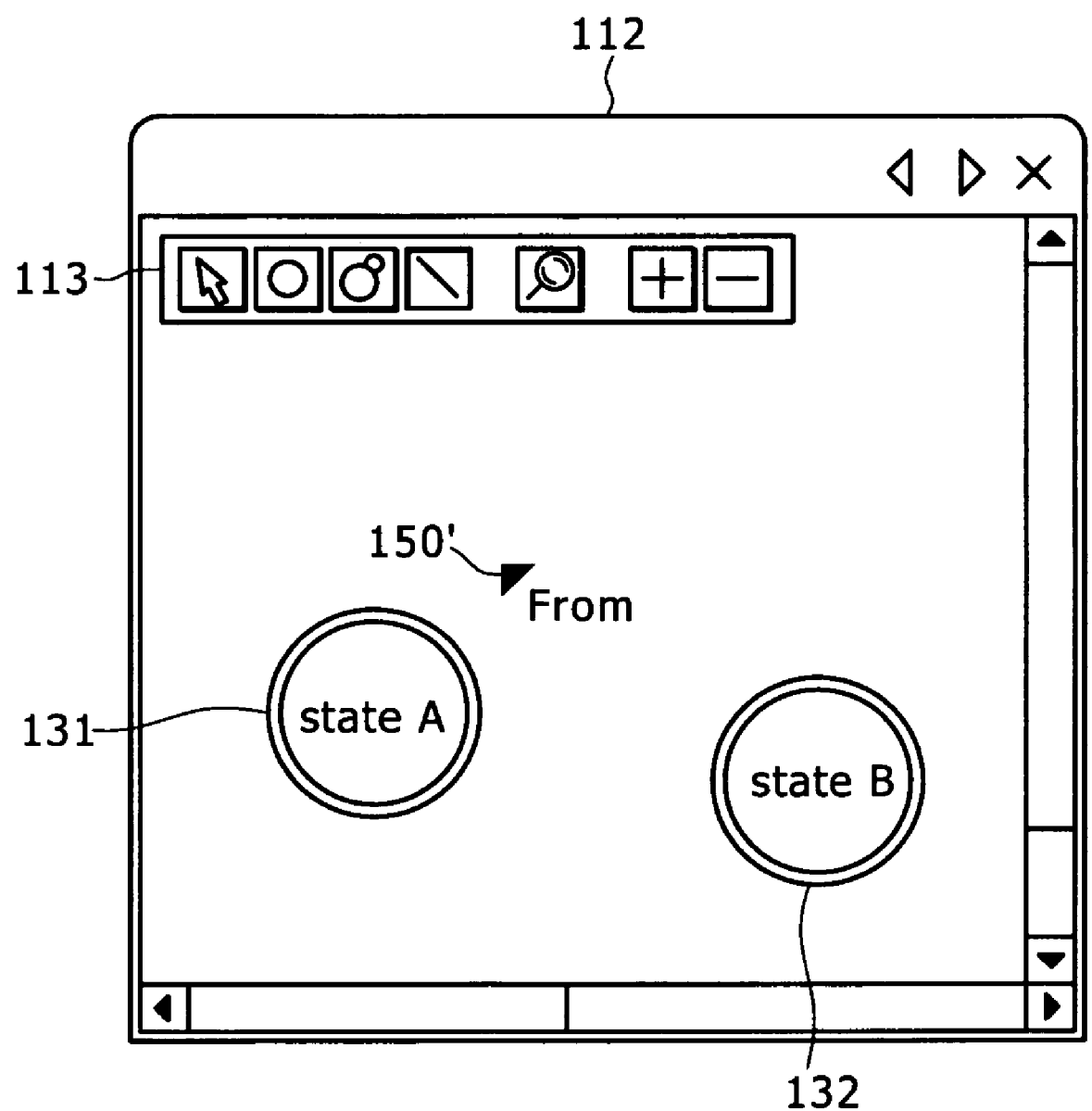

At step S162, the transition editing display control section 53 determines whether or not the pointer 150 currently exists within the state transition diagram display screen 112 based on the operation signal supplied from the operation section 11, the operation signal corresponding to a user operation. If it is determined that the pointer 150 exists within the state transition diagram display screen 112, the pointer display control section 53a switches the appearance of the pointer 150 to an icon designed for a transition starting point at step S163. That is, for example, the pointer display control section 53a switches the appearance of the pointer 150 to a pointer 150' as illustrated in FIG. 16. The pointer 150' is an icon having the shape of a right-angled isosceles triangle with its vertex angle facing in the upper-left direction and having "From" attached thereto in order to indicate that the user is now supposed to be trying to set the starting point of a transition.

At step S164, the transition editing display control section 53 determines whether or not clicking (or any other equivalent operation) of the operation section 11 has been performed based on the operation signal supplied from the operation section 11. If it is determined at step S164 that the clicking thereof has not been performed, control returns to step S162. If it is determined at step S162 that the pointer 150 is not positioned within the state transition diagram display screen 112, the appearance of the pointer is switched to the regular one (or, in the case where the pointer originally assumes the regular appearance, the pointer continues to assume the regular appearance).

Meanwhile, if it is determined at step S164 that the clicking of the operation section 11 has been performed, it is determined at step S165 whether or not the pointer 150' is positioned within any one of the state frames. That is, as there are only the state frames 131 and 132 in this example, it is determined whether or not the pointer 150' is positioned within the range of the frame 131 or the frame 132. If it is determined at step S165 that the pointer 150' is not positioned within any state frame, control returns to step S162.

Figure 17:
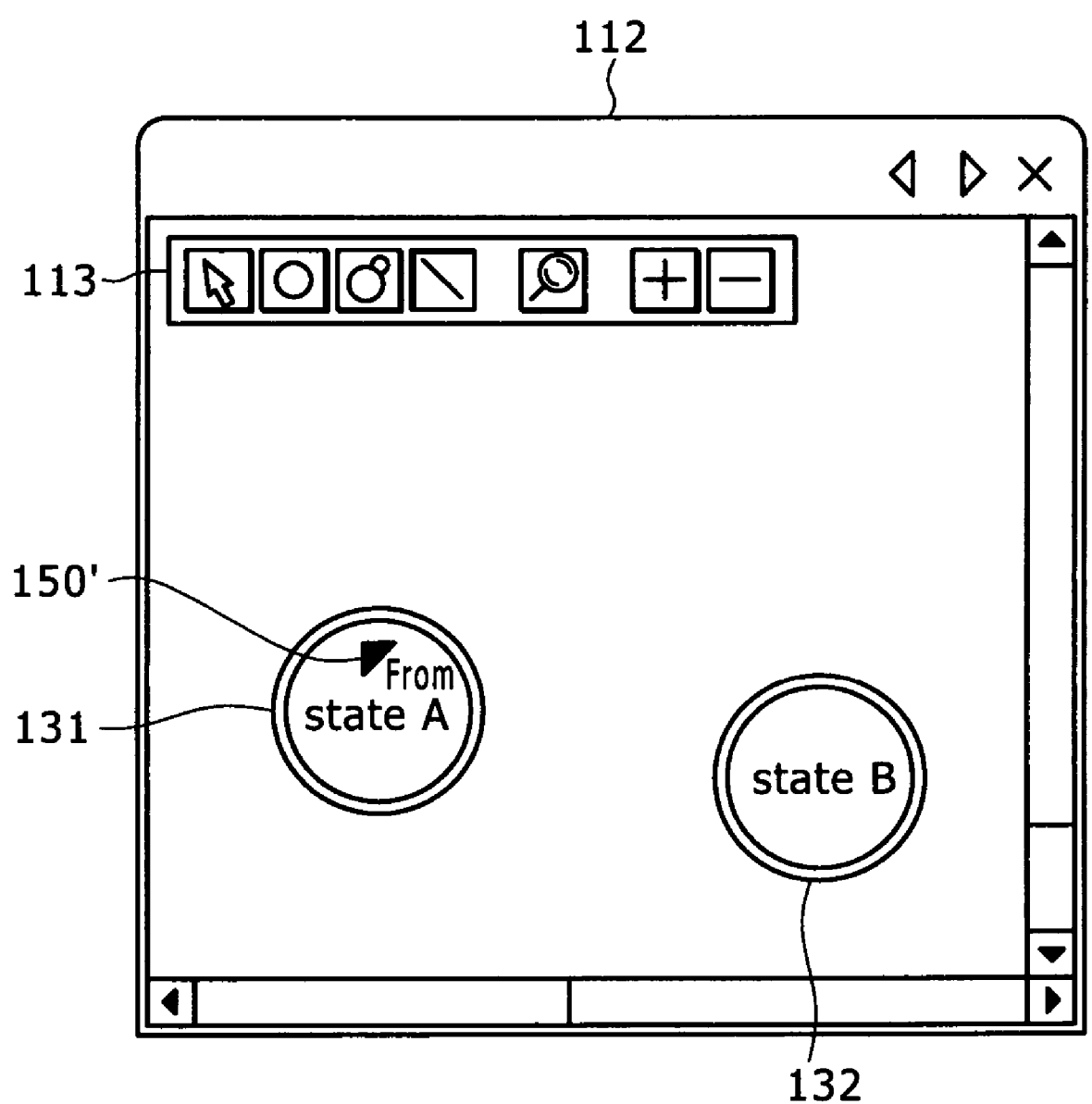

Meanwhile, if the pointer 150' is positioned within the state frame 131 as illustrated in FIG. 17, for example, it is determined at step S165 that the pointer 150' is positioned within any state frame, and then control proceeds to step S167.

At step S167, the transition editing display control section 53 controls the starting point position memory 53b so that the starting point position memory 53b stores the position of the state frame within which the pointer 150' is positioned. That is, if the pointer 150' is move to the inside of a state frame and clicking of the operation section 11 is performed, the state that becomes the starting point of the transition is set.

Figure 18:
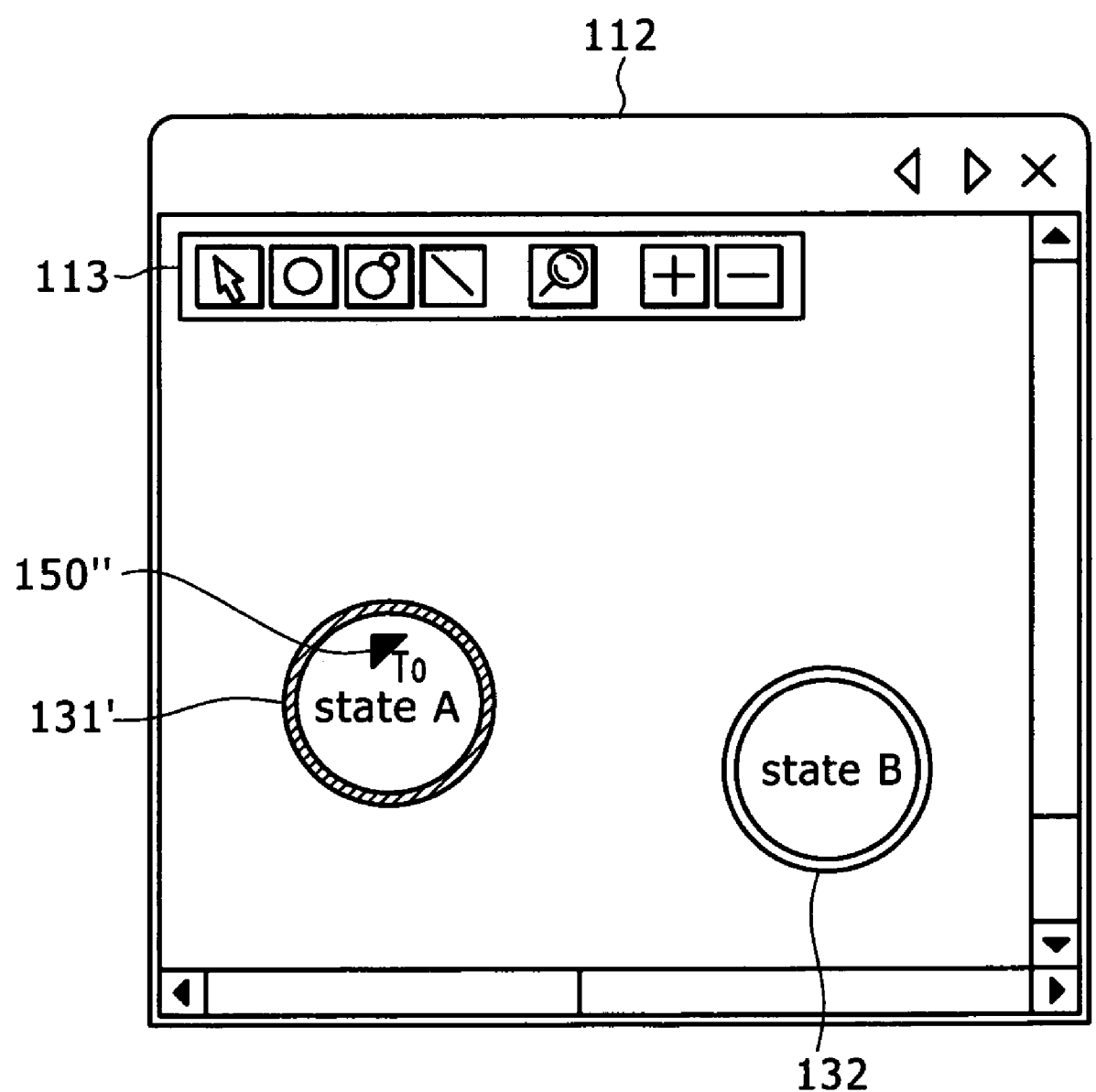
Figure 19:
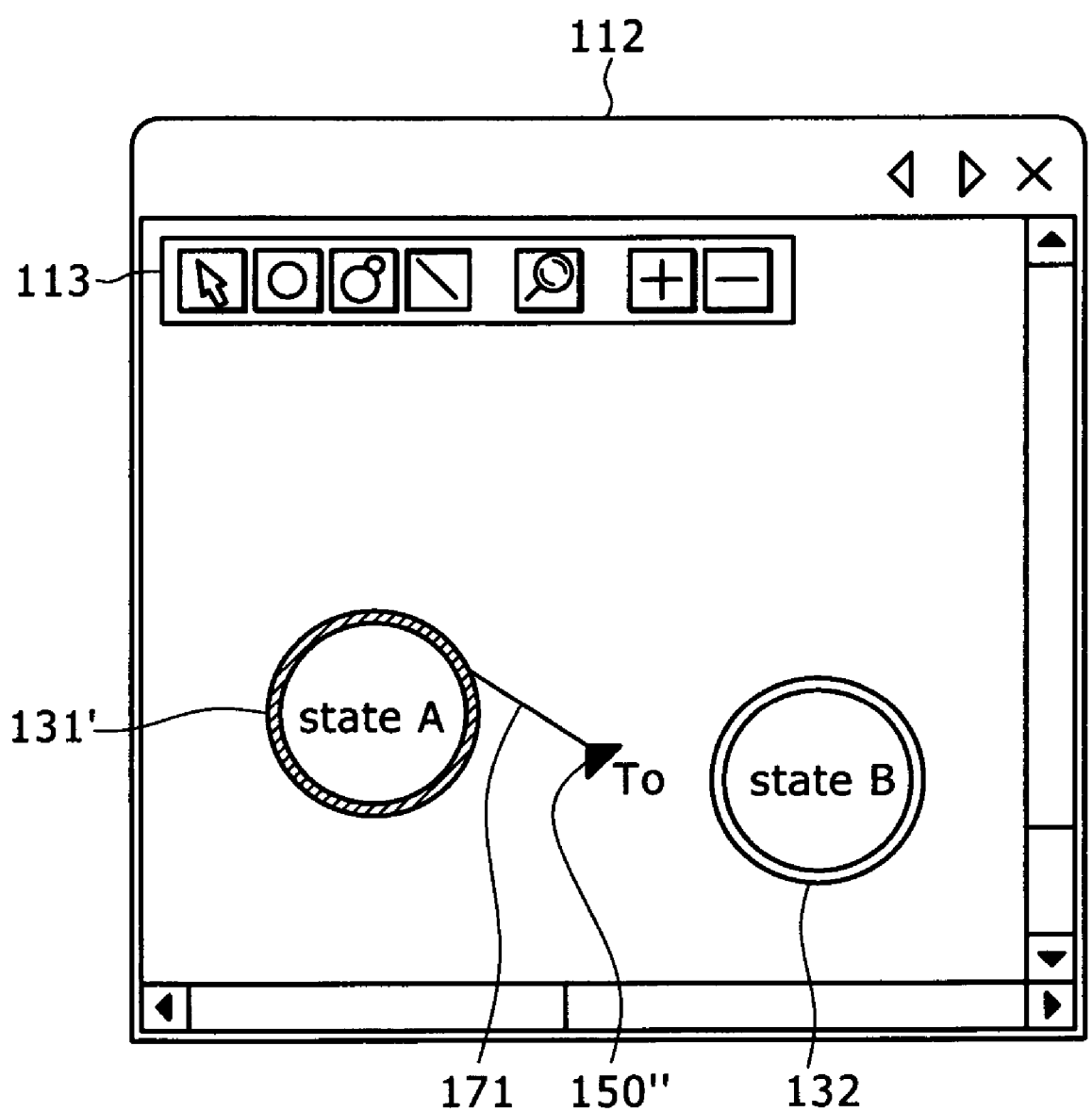

At step S168, the transition editing display control section 53 determines whether or not the pointer 150' currently exists within the state transition diagram display screen 112 based on the operation signal supplied from the operation section 11, the operation signal corresponding to a user operation. If it is determined that the pointer 150' exists within the state transition diagram display screen 112, the pointer display control section 53a switches the pointer to an icon designed for a transition end point at step S169. That is, for example, the pointer display control section 53a switches the appearance of the pointer to a pointer 150" as illustrated in FIG. 18. The pointer 150" is an icon having the shape of a right-angled isosceles triangle with its vertex angle facing in the upper-left direction and having "To" attached thereto in order to indicate that the user is now supposed to be trying to set the end point of the transition. In addition, if the pointer 150" is moved out of the range of the state frame 131, the pointer display control section 53a displays a provisional transition 171 so as to extend between the state frame 131, which is the transition starting point, and the pointer 150" as illustrated in FIG. 19. Moreover, the state frame display control section 53c changes the color of the state frame 131, which is the transition starting point, so that the state frame 131 is displayed as a state frame 131' as illustrated in FIGS. 18 and 19, for example.

At step S170, the transition editing display control section 53 determines whether or not clicking of the operation section 11 (or any other equivalent operation) has been performed based on the operation signal supplied from the operation section 11. If it is determined at step S170 that clicking thereof has not been performed, control returns to step S168. If it is determined at step S168 that the pointer 150' is not positioned within the state transition diagram display screen 112, the pointer is switched to the regular icon (e.g., the pointer 150 as illustrated in FIG. 2).

Meanwhile, if it is determined at step S170 that clicking of the operation section 11 has been performed, it is determined at step S171 whether or not the pointer 150" exists within any state frame that can be the transition end point. That is, because the state frame 131 has been designated as the transition starting state in this example, it is determined whether or not the pointer 150" exists within the range of the state frame 132. If it is determined at step S171 that the pointer 150" does not exist within any state frame that can be the transition end point, control returns to step S168.

Figure 20:
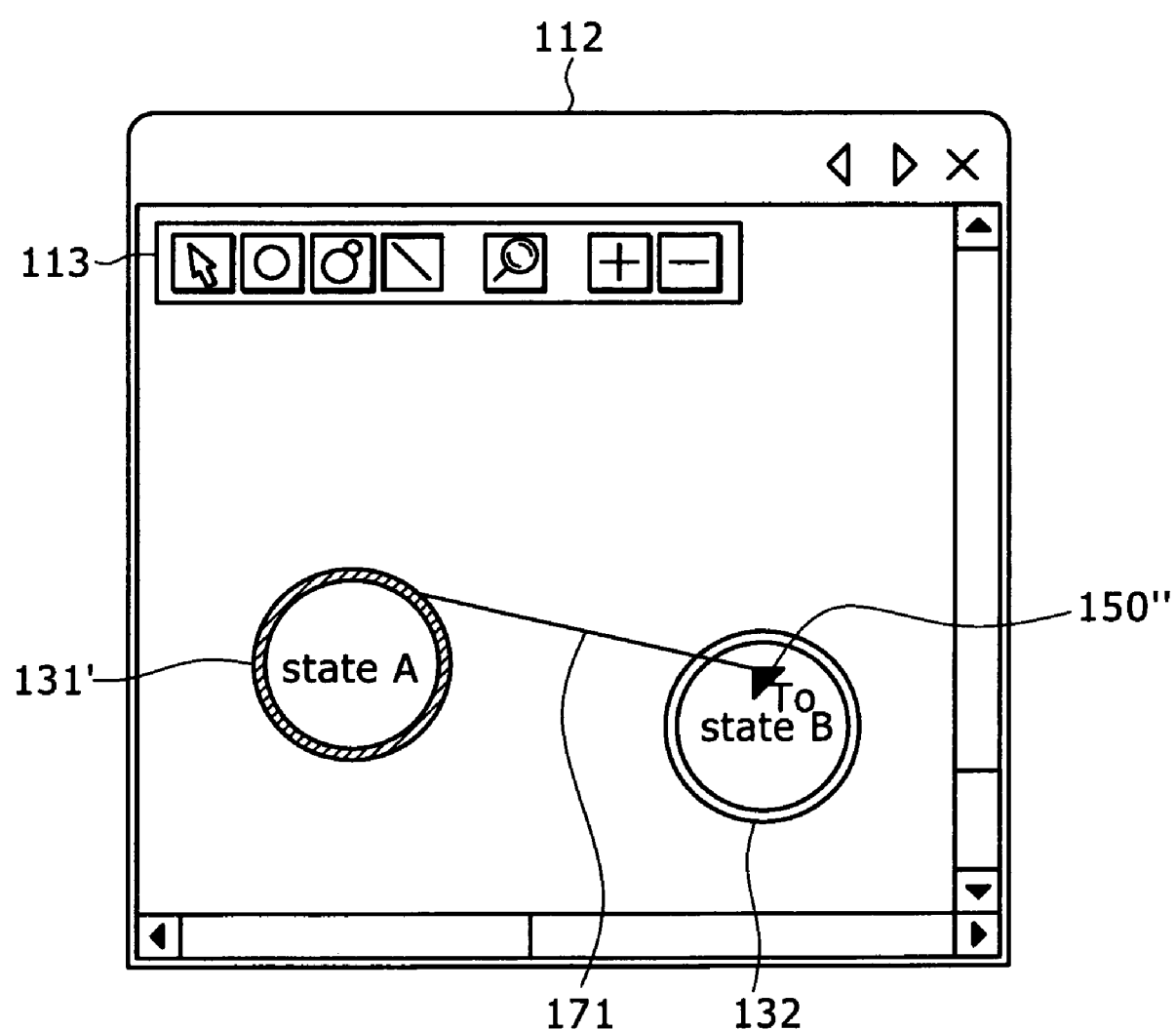

If it is determined at step S171 that the pointer 150" exists within the state frame 132 as illustrated in FIG. 20, it is determined that the pointer 150" is positioned within any state frame that can be the transition end point, and then control proceeds to step S173.

Figure 21:
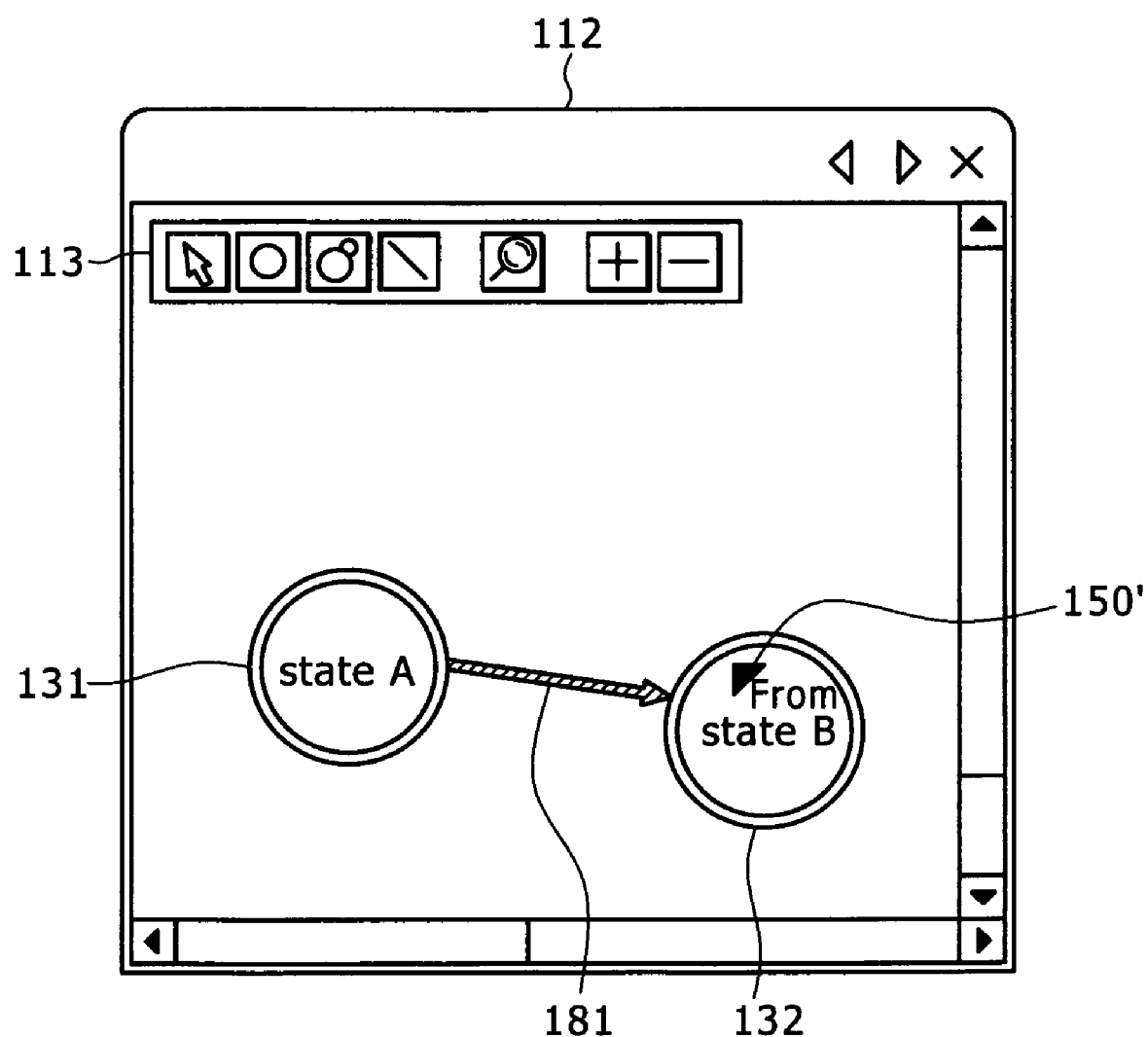

At step S173, the transition editing display control section 53 displays a line segment representing the transition on the display section 18 such that the line segment joins the clicked-on state frame that is to be the transition end point with the state frame corresponding to the position stored in the starting point position memory 53b. That is, in this example, the transition editing display control section 53 displays a transition 181 that joins the state frame 131, which is the transition starting point, with the state frame 132, which is the transition end point, as illustrated in FIG. 21, for example.

At step S174, the transition editing display control section 53 determines whether or not an instruction to finish the transition editing has been issued. If it is determined that the instruction to finish the transition editing has not been issued, control returns to step S162. Meanwhile, if it is determined that the instruction to finish the transition editing has been issued, the transition editing display process is finished. Note that in the case where the instruction to finish the transition editing is not issued after the state frame that is to be the transition end point is set, control returns to step S162; therefore, in this case, the pointer display control section 53a switches the pointer 150" to the pointer 150 immediately as long as the pointer is positioned within the state transition diagram display screen 112.

The above-described process eliminates the need, when performing the transition editing, to perform an operation of, e.g., dragging the pointer from the transition starting state frame to the transition destination state frame, whereby the likelihood of erroneous drawing of the transition on the state transition diagram is reduced. Further, because the appearance of the icon representing the pointer is changed when the transition starting state has been set, the user is able to recognize whether the next state to be specified is the transition starting state or the transition destination state. This contributes to successful edition of the transition.

Suppose that the position of the transition starting state frame has been stored by the process of step S167 in the transition editing and thereafter the user moves the pointer 150' over the state transition diagram display screen 112 in order to locate the transition destination state frame while viewing the screen. In this case, as illustrated in FIG. 22, for example, the transition destination state frame 132 may be located at a position that requires operation of a scroll bar 211 or 212 for the transition destination state frame 132 to be displayed on the screen. In this case, the transition starting state frame 131 may disappear from the state transition diagram display screen 112 as a result of operating the scroll bar 211 or 212 to display the transition destination state frame 132 on the screen.

As such, after the transition starting state frame is set, the state frame display control section 53c may inquire, of the starting point position memory 53b, the position of the transition starting state frame at predetermined intervals and, at the point when it is found that the display of the transition starting state frame on the state transition diagram display screen 112 has become impossible, display a transition starting state frame display section 201 as illustrated in FIG. 22, thereby enabling the user to recognize the transition starting state frame 131.

The display of the transition starting state frame display section 201 enables the user to recognize the transition starting state frame and thereby draw the transition accurately even in the case where the two state frames between which the transition should be drawn are so distant from each other that the two state frames cannot be displayed concurrently on the state transition diagram display screen.

The above-described transition editing display process corresponds with the transition editing process as described with reference to the flowchart of FIG. 6. Specifically, the process of determining whether any existing state has been selected at step S41 is equivalent to the process of step S165 in the transition editing display process, and it is the process of determining whether or not clicking has been performed when the pointer 150' resides within a state frame that is to be the transition starting point. In addition, the process of determining whether or not the transition destination state has been designated at step S43 is equivalent to the process of step S171 in the transition editing display process, and it is the process of determining whether or not clicking has been performed when the pointer 150" resides within a state frame that is to be the transition end point. As is apparent from the above, the transition editing display process and the transition editing process are closed associated with each other.

The above-described embodiment of the present invention eliminates the need, when performing an edition of, e.g., linking two state frames with a transition, to perform an operation of, e.g., dragging the pointer from the transition starting state frame to the transition destination state frame to link the two state frames with the transition, thereby reducing the likelihood of erroneous edition of the transition. Further, the above-described embodiment changes the appearance of the state frame of the state designated as the transition starting state at the time of designation, and displays the provisional transition extending from the transition starting state frame, thereby facilitating the edition of the transition. Still further, in the above-described embodiment, when scrolling of the state transition diagram display screen 112 results in disappearance of the transition starting state frame from the state transition diagram display screen 112, the transition starting state frame display section 201 indicating the transition starting state frame is displayed, whereby the user is able to edit the transition while recognizing the transition starting state accurately, leading to more accurate edition of the transition. As a result, efficiency in program development based on the state transition diagram is improved.

The above-described series of processes can be implemented by either hardware or software. In the case where the series of processes are implemented by software, a program that forms the software and is stored in a program recording medium is installed into a dedicated computer or a general-purpose personal computer that, when various programs are installed thereon, becomes capable of performing various functions, for example.

FIG. 23 illustrates the structure of an exemplary personal computer employed in the case where the internal electrical structure of the state transition program editing apparatus 1 of FIG. 1 is implemented by software. A CPU 501 of the personal computer controls the overall operation of the personal computer. In addition, when a user instruction is inputted via an input section 506 formed by a keyboard, a mouse, or the like and received via an input/output interface 505 and a bus 504, the CPU 501 executes a program stored in a read only memory (ROM) 502 in accordance with the user instruction. The CPU 501 also loads a program, which has been read from a removable medium 521 (e.g., a magnetic disk, an optical disk, a magneto-optical disk, or a semiconductor memory) connected to a drive 510 and installed in a storage section 508, to a random access memory (RAM) 503 and executes the program. In this manner, the functions of the above-described state transition program editing apparatus 1 of FIG. 1 are implemented by the software. The CPU 501 also controls a communication section 509 to communicate with an external device and transmit or receive data to or from the external device.

The program storage media that store programs to be installed into the computer so as to be executable by the computer are, as illustrated in FIG. 23, constituted by the removable medium 521, the ROM 502 for temporary or permanent storage of a program, a hard disk forming the storage section 508, and the like. The removable medium 521 is a packaged medium, and examples of the removable medium 521 include magnetic disks (including a flexible disk), optical disks (including a CD-ROM (Compact Disc-Read Only Memory) and a DVD (Digital Versatile Disc)), magneto-optical disks, and a semiconductor memory. The storage of a program into such a program recording medium is achieved as necessary via the communication section 509, which is an interface for a router, a modem, or the like, employing a wired or wireless communication means such as a local area network, the Internet, or digital satellite broadcasting.

Note that the steps implemented by the program stored in the program recording medium and described in the present specification may naturally be performed chronologically in order of description but do not have to be performed chronologically. Some steps may be performed in parallel or independently of one another.

It should be understood by those skilled in the art that various modifications, combinations, sub-combinations and alterations may occur depending on design requirements and other factors insofar as they are within the scope of the appended claims or the equivalents thereof.

The invention claimed is:

1. An information processing method, comprising:
generating a state transition diagram based on state transition information including information of operations to be performed in respective states, events that trigger transitions in the respective states, and transition destination states of the respective events;
displaying the state transition diagram;
manipulating the displayed state transition diagram;
updating the state transition information in accordance with how the state transition diagram has been manipulated; and
storing a position of a state designated as a transition starting state by the manipulating step, wherein
when the position of the transition starting state has been specified by the manipulating step, the displaying step displays as a pointer an icon indicating that the position of the transition starting state has been specified, and
when a position of a transition destination state has been specified by the manipulating step, the displaying step displays a first transition directed from the stored transition starting state toward the transition destination state, and the updating step updates the state transition information by adding information of the first transition to the state transition information.

2. The information processing method according to claim 1, wherein, when the position of the transition starting state has been specified by the manipulating step, the displaying step displays a second transition joining the pointer with the position of the transition starting state.

3. An information processing apparatus, comprising:
generation means for generating a state transition diagram based on state transition information including information of operations to be performed in respective states, events that trigger transitions in the respective states, and transition destination states of the respective events;
display means for displaying the state transition diagram;
manipulation means for manipulating the displayed state transition diagram;
update means for updating the state transition information in accordance with how the state transition diagram has been manipulated; and
storage means for storing a position of a state designated as a transition starting state by the manipulation means, wherein
when the position of the transition starting state has been specified by the manipulation means, the display means displays as a pointer an icon indicating that the position of the transition starting state has been specified, and
when a position of a transition destination state has been specified by the manipulation means, the display means displays a first transition directed from the stored transition starting state toward the transition destination state, and the update means updates the state transition information by adding information of the first transition to the state transition information.

4. A computer-readable recording medium recorded with a program that causes a computer to execute an information processing method, the method comprising:
generating a state transition diagram based on state transition information including information of operations to be performed in respective states, events that trigger transitions in the respective states, and transition destination states of the respective events;
displaying the state transition diagram;
manipulating the displayed state transition diagram;
updating the state transition information in accordance with how the state transition diagram has been manipulated; and
storing a position of a state designated as a transition starting state by the manipulating step, wherein
when the position of the transition starting state has been specified by the manipulating step, the displaying step displays as a pointer an icon indicating that the position of the transition starting state has been specified, and when a position of a transition destination state has been specified by the manipulating step, the displaying step displays a first transition directed from the stored transition starting state toward the transition destination state, and the updating step updates the state transition information by adding information of the first transition to the state transition information.

5. A program that causes a computer to execute an information processing method, the method comprising:

generating a state transition diagram based on state transition information including information of operations to be performed in respective states, events that trigger transitions in the respective states, and transition destination states of the respective events;

displaying the state transition diagram;

manipulating the displayed state transition diagram;

updating the state transition information in accordance with how the state transition diagram has been manipulated; and storing a position of a state designated as a transition starting state by the manipulating step, wherein when the position of the transition starting state has been specified by the manipulating step, the displaying step displays as a pointer an icon indicating that the position of the transition starting state has been specified, and when a position of a transition destination state has been specified by the manipulating step, the displaying step displays a first transition directed from the stored transition starting state toward the transition destination state, and the updating step updates the state transition information by adding information of the first transition to the state transition information.

6. An information processing apparatus, comprising:

a generation section configured to generate a state transition diagram based on state transition information including information of operations to be performed in respective states, events that trigger transitions in the respective states, and transition destination states of the respective events;

a display section configured to display the state transition diagram;

a manipulation section configured to manipulate the displayed state transition diagram;

an update section configured to update the state transition information in accordance with how the state transition diagram has been manipulated; and a storage section configured to store a position of a state designated as a transition starting state by the manipulation section, wherein when the position of the transition starting state has been specified by the manipulation section, the display section displays as a pointer an icon indicating that the position of the transition starting state has been specified, and when a position of a transition destination state has been specified by the manipulation section, the display section displays a first transition directed from the stored transition starting state toward the transition destination state, and the update section updates the state transition information by adding information of the first transition to the state transition information.

* * * * *